(12) United States Patent  
Iwata et al.

(10) Patent No.: US 7,549,594 B2  
(45) Date of Patent: Jun. 23, 2009

(54) ELECTRONIC DEVICE HAVING PLURALITY OF FUNCTIONAL UNITS AND CONTROLLER FOR CONTROLLING REGISTERS ACCORDING TO STATUS OF FUNCTIONAL UNITS

(75) Inventors: Kazuya Iwata, Osaka (JP); Tatsuya Adachi, Osaka (JP); Seiji Nakamura, Osaka (JP)

(73) Assignee: Panasonic Corporation, Osaka (JP)

( * ) Notice: Subject to any disclaimer, the term of this patent is extended or adjusted under 35 U.S.C. 154(b) by 360 days.

(21) Appl. No.: 10/578,891

(22) PCT Filed: Nov. 5, 2004

(86) PCT No.: PCT/JP2004/016392

§ 371 (c)(1),  
(2), (4) Date: Jul. 24, 2006

(87) PCT Pub. No.: WO2005/048176

PCT Pub. Date: May 26, 2005

(65) Prior Publication Data

US 2007/0080203 A1 Apr. 12, 2007

(30) Foreign Application Priority Data

Nov. 12, 2003 (JP) .............................. 2003-383000

(51) Int. Cl.  
*G06K 19/06* (2006.01)

(52) U.S. Cl. ................... 235/492; 235/375; 235/439; 235/476; 235/472.01

(58) Field of Classification Search .................. 235/375, 235/380, 439, 476, 492, 472.01  
See application file for complete search history.

(56) References Cited

U.S. PATENT DOCUMENTS 5,546,593 A 8/1996 Kimura et al.

6,764,017 B2 * 7/2004 Chen et al. .................. 235/492  
2002/0053036 A1 5/2002 Kubota  
2003/0218071 A1 11/2003 Chen et al.

FOREIGN PATENT DOCUMENTS

| JP | 6-44089 | 2/1994 |
|---|---|---|
| JP | 2000-151696 | 5/2000 |
| JP | 2002-149292 | 5/2002 |
| JP | 2002-149410 | 5/2002 |
| JP | 2002-245428 | 8/2002 |
| JP | 2003-216909 | 7/2003 |

OTHER PUBLICATIONS

Supplemental European Search Report issued Dec. 1, 2008 in the European Application No. 04818456.8.

* cited by examiner

*Primary Examiner*—Seung H Lee  
(74) *Attorney, Agent, or Firm*—Wenderoth, Lind & Ponack, L.L.P.

(57) ABSTRACT

An electronic apparatus includes a controller having an interface part communicating with an external host apparatus and a status register group, and having a plurality of functional units communicating with the host apparatus via the interface part, respectively. The status register group includes operable status registers corresponding to the functional units respectively and indicating whether or not the corresponding functional units are in an operable state, and processing status registers corresponding to the functional units respectively and indicating whether or not the corresponding functional units are in a Function-Being-Processed State. When a command received from the host apparatus is provided for any one of the functional units, the controller transfers the command to the functional unit. In the case of a read command for the status register group, the controller transmits a status of the status register group to the host apparatus as a response.

15 Claims, 15 Drawing Sheets

ELECTRONIC DEVICE HAVING PLURALITY OF FUNCTIONAL UNITS AND CONTROLLER FOR CONTROLLING REGISTERS ACCORDING TO STATUS OF FUNCTIONAL UNITS

BACKGROUND OF THE INVENTION

1. Technical Field

The present invention relates to an electronic apparatus and a method of controlling the electronic apparatus.

2. Background Art

In recent years, an IC card including a storage medium such as a flash memory as a storage device of a portable information equipment (e.g., a portable personal computer, a digital still camera, or a PDA), attracts attention. The portable information equipment handles a large amount of data such as music data or video data. Further, the IC card plays not only roles as a storage device for storing data and a bridge media for exchanging data between equipment but also a role as an apparatus for extending functions of equipment (See, for example, Non-Patent Document 1). Such an IC card including a plurality of functional units is referred to as a multifunctional IC card.

Referring to FIG. 15, a configuration of a multifunctional IC card according to a prior art disclosed in a publication will be described. FIG. 15 is a block diagram showing the configuration of the multifunctional IC card according to the prior art. The multifunctional IC card includes a plurality of functional units. A host apparatus and the respective functional units communicate with each other via a common interface part independently of one another (which means a fundamental communication form, and which does not exclude, for example, that the host apparatus transmits a common command addressed to a plurality of functional units).

Referring to FIG. 15, reference numeral 101 denotes the host apparatus, and reference numeral 1502 denotes the multifunctional IC card. The multifunctional IC card 1502 includes a controller 1511, a first functional unit 112, a second functional unit 113, and a third functional unit 114. The multifunctional IC card 1502 is connected to the host apparatus 101 via a bus 141. The bus 141 includes a command signal line 142, a data line 143, a power source line, and a ground line (the power line and the ground line are not shown in FIG. 15). The controller 1511 includes an interface part 121, which communicates with the host apparatus 101 via the bus 141.

According to the prior art, the host apparatus 101 is a computer. The first functional unit 112 is a memory module (constituted by a flash memory). The second functional unit 113 is a radio communication module. The third functional unit 114 is a camera module. The host apparatus 101 serves as a master, and the multifunctional IC card 1502 serves as a slave. The host apparatus 101 and the multifunctional IC card 1502 perform master-slave communication.

A method of activating the multifunctional IC card according to the prior art will be described.

When the host apparatus 101, onto which the multifunctional IC card 1502 is mounted, is powered on or the multifunctional IC card 1502 is inserted into the host apparatus 101, the host apparatus 101 supplies an electric power to the multifunctional IC card 1502 via the bus 141 (the power source line and the ground line). The host apparatus 101 transmits an activation command to the multifunctional IC card 1502. Activation of all of the functional units (including the controller and the respective functional units) of the multifunctional IC card 1502 is executed. Concretely, the controller 1511, the first functional unit 112, the second functional unit 113, and the third functional unit 114 are activated independently of one another. The activation of the respective functional units is sequentially completed, and when the activation of all of the functional units is completed, the respective functional units 112 to 114 turn operable.

Next, a method of operating the multifunctional card according to the prior art will be described.

The host apparatus 101 transmits an operation command (used as a block erasure command) to the first functional unit (the memory module) 112. The first functional unit (the memory module) 112 starts a block erasure processing based on the received command. The first functional unit (the memory module) 112 outputs a busy signal (Low level) to the host apparatus 101 via the interface part 121 and the data line 143 (the busy signal indicates that even if the host apparatus 101 outputs a next command, the first functional unit 112 cannot operate in response to the command). While the busy signal is outputted to the data line 143, the host apparatus 101 recognizes that the multifunctional IC card 1502 is operating. Therefore, the host apparatus 101 cannot transmit another command to the multifunctional IC card 1502.

When the first functional unit (the memory module) 112 completes the block erasure processing, the first functional unit (the memory module) 112 stops outputting the busy signal. Namely, the data line 143 turns from a Low-level output state to a High-level output state (a state in which an output of the interface part 121 has a predetermined impedance, and data can be transmitted, for example, from the host apparatus 101 to the interface part 121 via the data line 143). Then, the host apparatus 101 recognizes that the multifunctional IC card 1502 is ready (not busy). The host apparatus 101 can transmit another command to the multifunctional IC card 1502.

Next, the host apparatus 101 transmits an operation command (used as a received data output request command) to the second functional unit 113. The second functional unit (the radio communication module) 113 starts a processing for reading out and outputting received data stored in an internal memory based on the command from the host apparatus 101. While the second functional unit (the radio communication module) 113 is performing the processing for reading out and outputting the received data, the second functional unit (the radio communication module) 113 outputs a busy signal (Low level) to the host apparatus 101 via the interface part 121 and the data line 143.

A method of reactivating the frozen multifunctional IC card will be described below.

The first functional unit (the memory module) 112 starts a processing for writing data based on an operation command from the host apparatus 101. When the processing for writing data is not completed within a predetermined time, the host apparatus 101 judges that the first functional unit (the memory module) 112 is frozen. In addition, the host apparatus 101 transmits a reactivation command to all of the functional units of the multifunctional IC card 1502. Then, all of the functional units of the multifunctional ID card 1502 are reactivated. When activation of all the functional units is completed, the respective functional units 112 to 114 turn operable.

As stated above, in a system constituted by the host apparatus and the multifunctional IC card, the host apparatus and the respective functional units communicate with each other via the interface part independently of one another. Alternatively, another electronic apparatus is conceivable, in which one CPU performs all communications with a host apparatus via an interface part, and the CPU controls a part of or all of a plurality of functional units. The above-mentioned configuration of this multifunctional IC card has the following great advantageous effects. A common circuit (referred to as a controller in the specification) for integrating a plurality of functional units can be relatively small as compared with configurations of the other electronic apparatuses. It is unnecessary to change a basic configuration of the controller no matter what types of functional units are integrated. A period for developing and expanding an apparatus type can be shortened, and the various type of electronic apparatus can be expanded.

Non-Patent Document 1: "Matsushita Technical Journal, Volume 48, No. 2", Ohmsha, Ltd., April 2002, pp. 20-23.

Recently, the multifunctional IC card has increasingly played a role as an equipment function expanding apparatus for adding an optional function to the host apparatus by attaching the multifunctional IC card to the host apparatus. One multifunctional IC card tends to incorporate more functions therein.

In the electronic apparatus (e.g., the multifunctional IC card) according to the prior art which includes a plurality of functional units and in which the host apparatus and the respective functional units communicate with each other via the common interface independently of one another, the host apparatus operates as follows. The host apparatus transmits an activation command or the other processing command to each functional unit. After the activation of all of the functional units is completed or a certain functional unit completes a processing, the host apparatus transmits a new processing command to each functional unit.

However, the respective functional units have an activation time different from each other. The electronic apparatus according to the prior art has such a problem that the host apparatus cannot transmit a command to the operable functional unit while the functional unit having a long activation time is active even after the activation of the functional unit having a short activation time is completed and the functional unit turns operable.

As functions of the electronic apparatus (e.g., the multifunctional IC card) diversify, there is such a problem that the time for the host apparatus to wait until all the functional units are completed with activation becomes longer.

Since the host apparatus judges whether the electronic apparatus is busy or ready as a whole and transmits a next command to the electronic apparatus, there is another problem that the host apparatus cannot transmit commands to different functional units in parallel.

Furthermore, since the host apparatus recognizes the electronic apparatus or multifunctional IC card as one IC card, there is the other problem that it is required to reactivate the entire IC card when one functional unit is frozen.

In the electronic apparatus according to the prior art, the host apparatus is incapable of confirming whether or not each functional unit is operable.

In the electronic apparatus according to the prior art, in order for the host apparatus to confirm whether or not each functional unit is operable, transmission of a command, for example, for inquiring the functional unit of its status from the host apparatus may be considered. However, when the functional unit is inoperable (inactive or incapable of responding to the host apparatus), the host apparatus cannot receive a response to the command. The host apparatus recognizes that the functional unit is inoperable, based on the fact that the host apparatus cannot receive the response to the command transmitted to the functional unit within a predetermined time (time out).

However, the predetermined time based on which the host apparatus judges that time is out, is far longer than the ordinary communication time. With a method according to the prior art, when one or more functional units are inoperable, it takes quite a long time for the host apparatus to confirm whether or not all the functional units are operable. In addition, the fact that no response is transmitted back to the host apparatus may possibly be resulted from the other cause than the function being inoperable. In the electronic apparatus according to the prior art, it is difficult for the host apparatus to accurately confirm whether or not each functional unit is operable.

In the electronic apparatus according to the prior art, all the functional units are activated. However, a user often does not use some functional units. The activation of all of the functional units including those which are not used causes unnecessary power consumption.

SUMMARY OF THE INVENTION

The present invention has been achieved in light of these problems. It is an object of the present invention to provide an electronic apparatus (e.g., a multifunctional IC card) which includes a plurality of functional units, in which a host apparatus and the respective functional units communicate with each other via a common interface independently of one another, and which can promptly and accurately confirm whether or not each functional unit is operable, and to provide a method of controlling the electronic apparatus.

According to this configuration, the objects of the present invention are to provide the electronic apparatuses as follows.

An object of the present invention is to provide an electronic apparatus (e.g., a multifunctional IC card) in which a functional unit that has completed activation executes a processing in response to a command from a host apparatus while a different functional unit with a longer activation time is activating, and a method of controlling the electronic apparatus.

Another object of the present invention is to provide an electronic apparatus (e.g., a multifunctional IC card) in which a different command can be transmitted to another functional unit so that the another functional unit can execute a processing even while one functional unit is executing a processing and is busy, and a method of controlling the electronic apparatus.

A further object of the present invention is to provide an electronic apparatus (e.g., a multifunctional IC card) capable of reactivating functional units individually by unit.

A still further object of the present invention is to provide an electronic apparatus (e.g., a multifunctional IC card) capable of activating only one functional unit desired to operate in response to one command, and that can realize low power consumption, and a method of controlling the electronic apparatus.

In order to solve the above problems, the present invention has the following configurations.

According to an aspect of the present invention, there is provided an electronic apparatus comprising a controller and a plurality of functional units. The controller includes an interface part which communicates with an external host apparatus, and a status register group. The functional units communicate with the host apparatus via the interface part, respectively. The status register group includes a plurality of operable status registers and a plurality of processing status registers. The operable status registers correspond to the functional units, respectively, and indicate whether the corresponding functional units are operable (hereinafter referred to as "an operable state") or not (hereinafter referred to as "an inoperable state"). The processing status registers correspond to the functional units, respectively, and indicate whether the corresponding functional units are executing processings (hereinafter referred to as "a Function-Being-Processed State") or not (hereinafter referred to as "a Function-Unprocessed State"). The controller transfers a command to the functional unit when the controller receives the command from the host apparatus and the command is a command for any one of the functional units, and transmits a status of the status register group to the host apparatus as a response to the read command when the command is a read command for the status register group.

This invention can realize the electronic apparatus including a plurality of functional units, in which the host apparatus communicates with the respective functional units via the common interface, independently of one another, and in which the host apparatus can accurately recognize whether or not each functional unit is in the operable state and whether or not each functional unit is in the Function-Being-Processed State.

When each of the functional units is completed with activation and turns into the operable state, a method of rewriting the operable status register corresponding to the functional unit to indicate that the functional unit is in the operable state may be arbitrarily adopted. For example, each functional unit may directly rewrite the corresponding operable status register so as to indicate that the functional unit is in the operable state. Alternatively, the controller may communicate with each functional unit, and when the controller acquires information that the functional unit turns into the operable state, the controller may rewrite the operable status register corresponding to the functional unit so as to indicate that the functional unit is in the operable state.

When each functional unit turns into the Function-Being-Processed State, a method of rewriting the processing status register corresponding to the functional unit so as to indicate that the functional unit is in the Function-Being-Processed State may be arbitrarily adopted. For example, each functional unit may directly rewrite the corresponding processing status register so as to indicate that the functional unit is in the Function-Being-Processed State. Alternatively, the controller may communicate with each functional unit, and when the controller acquires information that the functional unit turns into the Function-Being-Processed State, the controller may rewrite the processing status register corresponding to the functional unit so as to indicate that the functional unit is in the Function-Being-Processed State.

In order to "transmit a status of the status register group to the host apparatus as a response to the read command", the controller may transmit a response that includes the status information on the status register group or a response to which data on the status information on the status register group to the host apparatus.

According to another aspect of the present invention, in the above-mentioned electronic apparatus, all the operable status registers of the status register group and all the processing status registers of the status register group are set to the inoperable state and the Function-Unprocessed State, respectively, when the controller is activated. This invention can be realized by an electronic apparatus that can activate the respective functional units independently of one another.

This invention has such an advantageous effect that, there can realized the electronic apparatus capable of reactivating only the functional unit without suspending processings of the other functional units when a certain functional unit is frozen.

According to a further aspect of the present invention, in the above-mentioned electronic apparatus, the interface part performs a master-slave system type data communication with the host apparatus, in which the host apparatus serves as a master, and the electronic apparatus serves as a slave. The functional unit starts activating upon receiving an activation command from the host apparatus. The operable status register corresponding to the functional unit turns from the inoperable state to the operable state when the functional unit turns into the operable state. The functional unit stops operation thereof and turns into the inoperable state, and the operable status register corresponding to the functional unit turns from the operable state to the inoperable state upon receiving a stop command for the functional unit from the host apparatus.

According to this invention, it is possible to recognize the functional unit completed with activation individually during activation. Therefore, it is possible to realize the electronic apparatus in which the functional unit that has already completed the activation, executes a processing in response to a command from the host apparatus even while the functional unit having a long activation time is being activated.

According to a still further aspect of the present invention, in the above-mentioned electronic apparatus, the status register group further includes a plurality of activation command registers corresponding to the functional units, respectively. The activation command registers is provided for activating the corresponding functional units. All the activation command registers of the status register group are set to be stopped when the controller is activated. The host apparatus starts activation of the functional unit by setting one of the activation command registers corresponding to one of the functional units that is to be activated, to be activated. The host apparatus stops the functional unit by setting the activation command register to be stopped.

This invention can realize the low power consumption electronic apparatus (including the multifunctional IC card) that can activate only the to-be-activated functional unit by one command (only a write command for the corresponding activation register).

When the activation register indicates that an operation start command for the corresponding functional unit is received, a method of starting operation of the corresponding functional unit may be arbitrarily adopted. For example, each activation register may be directly connected to the corresponding functional unit, and may directly instruct the functional unit to start the operation. Alternatively, the controller may communicate with each functional unit, and may directly instruct the functional unit to start the operation.

According to a further aspect of the present invention, in the above-mentioned electronic apparatus, the interface part performs a master-slave system type data communication with the host apparatus, in which the host apparatus serves as a master, and the electronic apparatus serves as a slave. The processing status register corresponding to the functional unit turns from the Function-Unprocessed State to the Function-Being-Processed State when the functional unit is in the Function-Being-Processed State. The processing status register corresponding to the functional unit turns from the Function-Being-Processed State to the Function-Unprocessed State when the functional unit finishes the function processing or when the functional unit is suspended in response to a command from the host apparatus.

According to this invention, when one functional unit is busy, it is possible to individually recognize whether or not the other functional unit is operable. The present invention has an advantageous effect in that the electronic apparatus that can transmit a different command to the other functional unit, and that enables the other functional unit to execute a processing (execute a processing in parallel to the processing of the one functional unit), even while one functional unit is busy to execute a processing, can be realized.

In the electronic apparatus, both the operable status register and processing status register may be combined as one register.

According to a still further aspect of the present invention, in the above-mentioned electronic apparatus, the host apparatus and the interface parts are connected to each other via a line including a command signal line and a data line. The command from the host apparatus to the electronic apparatus, the response from the electronic apparatus to the host apparatus, and data including data showing the status information on the status register group, are transmitted via the command signal line. Predetermined data that is to be transmitted from the host apparatus to the electronic apparatus, predetermined data that is to be transmitted from the electronic apparatus to the host apparatus, and a busy signal that indicates that the functional unit is in the Function-Being-Processed State and in busy state, are transmitted via the data line.

The host apparatus can recognize the status of the status register group via the command signal line even while the busy signal is outputted via the data line. According to the present invention, the host apparatus can recognize that one of the functional units is busy (inoperable) from the busy signal in a similar manner to that of the prior art. At the same time, the host apparatus (can easily recognize that the electronic apparatus, which serves as the slave, responds to a command from the host apparatus in a similar manner to that of the prior art, and while maintaining the compatibility with the electronic apparatus according to the prior art, the host apparatus) can individually recognize whether or not each functional unit is operable by the method according to the present invention.

This invention can realize the electronic apparatus that can exhibit the unique advantageous effects of the present invention while maintaining the compatibility with the electronic apparatus according to the prior art.

According to a further aspect of the present invention, in the above-mentioned electronic apparatus, the status register group further includes a plurality of bus release registers each of which releases a busy state of the data line so that the host apparatus transmits and receives data to and from one of the functional units other than the functional unit that is executing processings when the functional unit that is in the Function-Being-Processed State outputs the busy signal to the data line. The controller rewrites the bus release register upon receiving a rewrite command for the bus release register from the host apparatus. The interface part makes the host apparatus possible to transmit and receive the data to and from the functional unit other than the functional unit that is executing processings by stopping outputting the busy signal to the data line.

This invention realizes the electronic apparatus that adaptively permits or prohibits output of only the busy signal related to a specific functional unit. For example, the following operations can be performed. After the host apparatus transmits a command to the functional unit, and receives a busy signal from the first functional unit (that is, after the host apparatus recognizes that the first functional unit starts performing its processing), the host apparatus can prohibit the busy signal resulting from the first functional unit. Next, after the host apparatus transmits a command to the second functional unit, and receives a busy signal from the second functional unit, the host apparatus can recognize that the second functional unit starts performing its processing.

This invention can realize the electronic apparatus that can adaptively stop outputting the busy signal, and that enables the data line via which the busy signal is transmitted to be used for data transmission.

An electronic apparatus in which at least one of a plurality of data lines also serves as a busy signal transmission path, and which has the above-mentioned configuration, is included in the technical scope of the claims of the present invention. In order to stop outputting the busy signal, the method as claimed in the claims of the present invention may be used. Alternatively, the output of the busy signal may be completely prohibited irrespectively of which functional unit is attributed to the generation of the busy signal.

According to a still further aspect of the present invention, in the above-mentioned electronic apparatus, the functional unit that is in the Function-Being-Processed State acquires a bus use right when data transmission and reception between the host apparatus and the functional units is finished or when operation of the functional units is stopped, and the functional units selected by the host apparatus acquires the bus use right when the processing status registers corresponding to the plurality of functional units are in the Function-Being-Processed State, in the case that the host apparatus activates a plurality of functional units. This invention can realize the electronic apparatus that can return the bus use right to the functional unit that is still in the Function-Being-Processed State.

The electronic apparatus is a multifunctional IC card. This invention realizes the multifunctional IC card that exhibits the above-mentioned advantageous effects.

Moreover, the present invention realizes a method of controlling the electronic apparatus advantageously providing the same effect as the above-described electronic apparatus.

According to the present invention, it is advantageously possible to realize the electronic apparatus including a plurality of functional units, in which the host apparatus communicates with the respective functional units via the common interface, independently of one another, and in which the host apparatus can promptly and accurately recognize whether or not each functional unit is in the operable state, and the method of controlling the electronic apparatus, According to the present invention, it is advantageously possible to realize the electronic apparatus in which the functional unit that has already completed with the activation executes a processing in response to a command from the host apparatus even while the functional unit having a long activation time is being activated, and the method of controlling the electronic apparatus.

According to the present invention, it is advantageously possible to realize the electronic apparatus (including the multifunctional IC card) that can transmit a different command to the other functional unit even while one functional unit is busy to execute a processing, and that enables the other functional unit to execute a processing (execute a processing in parallel to the processing of the one functional unit), and the method of controlling the electronic apparatus.

According to the present invention, it is advantageously possible to realize the electronic apparatus (including the multifunctional IC card) that can reactivate only the frozen functional unit, and the method of controlling the electronic apparatus.

According to the present invention, it is advantageously possible to realize the low power consumption electronic apparatus (including the multifunctional IC card) that can activate only the to-be-activated functional unit by one command, and the method of controlling the electronic apparatus.

According to the present invention, it is advantageously possible to realize the electronic apparatus (including the multifunctional IC card) that can prevent a high activation current from being suddenly generated, and the method of controlling the electronic apparatus.

According to the present invention, it is advantageously possible to realize the electronic apparatus (including the multifunctional IC card) that enables the host apparatus to recognize the processing state of each functional unit at real time, and the method of controlling the electronic apparatus.

Novel features of the invention are none other than those described in the claims. The present invention as well as the other objects and features could be better understood and evaluated from the following detailed description that is understood in cooperation with the drawings in terms of both configuration and content.

DESCRIPTION OF REFERENCE SYMBOLS

Figure 1:
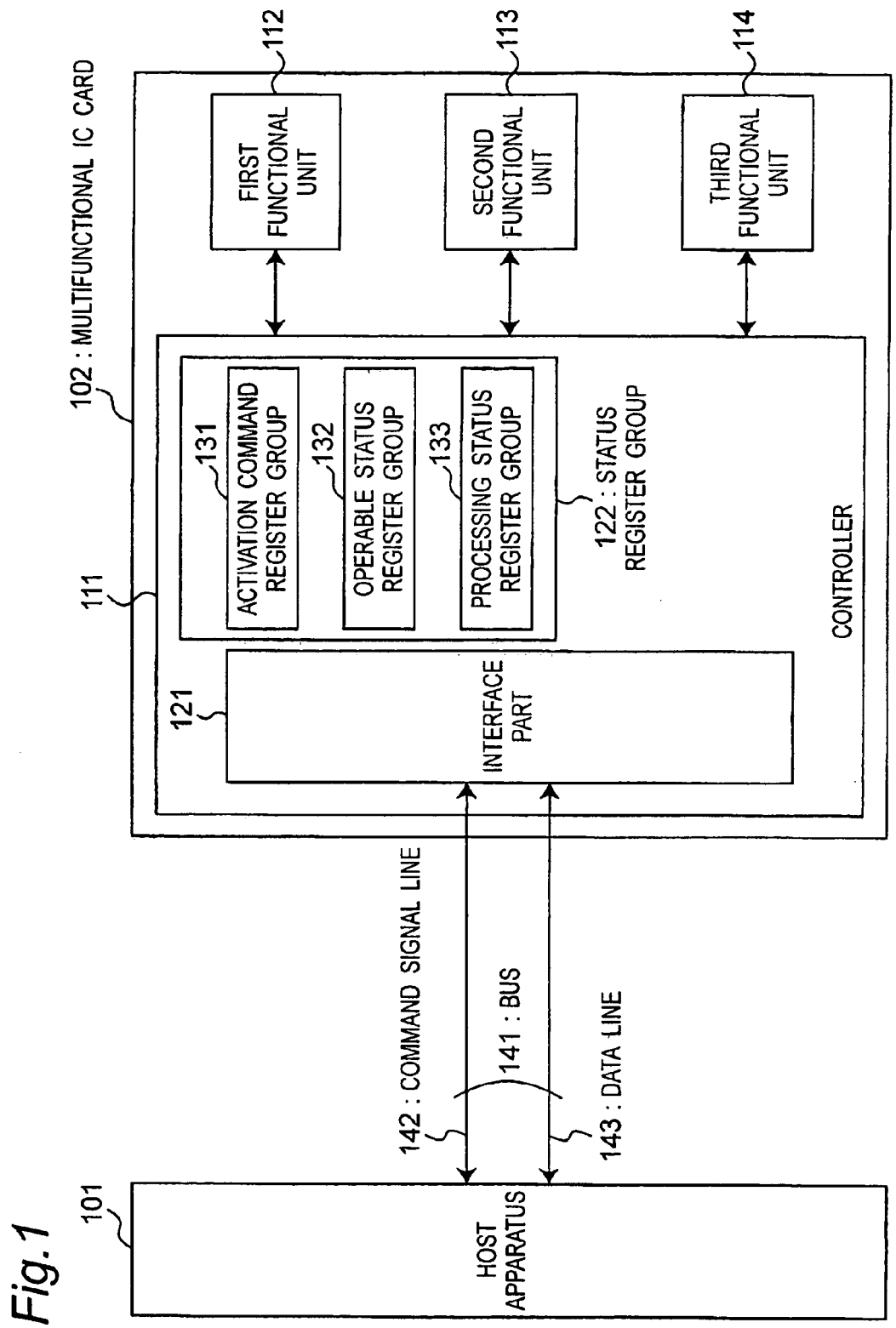
FIG. 1 is a block diagram showing a configuration of a host apparatus and that of a multifunctional IC card according to a first implemental example of the present invention.

101 . . . Host apparatus,
102, 802, 1502 . . . Multifunctional IC card,
111, 811, 1511 . . . Controller,
112 . . . First functional unit,
113 . . . Second functional unit,
114 . . . Third functional unit,
121 . . . Interface part,
122, 822 . . . Status register group,
131 . . . Activation command register group,
132 . . . Operable status register group,
133 . . . Processing status register group,
141 . . . Bus,
142 . . . Command signal line,
143 . . . Data line, and
834 . . . Bus release register group.

It should be noticed that a part of or all of the drawings are drawn in schematic expression for illustrative purposes, and that actual relative magnitudes and positions of elements shown in the drawings are not always drawn faithfully.

DETAILED DESCRIPTION OF THE INVENTION

Implemental examples of the best mode for carrying out the present invention will be described with reference to the drawings.

FIRST IMPLEMENTAL EXAMPLE

Referring to FIGS. 1 to 7, an electronic apparatus and a method of controlling the electronic apparatus according to a first implemental example will be described.

Figure 2:
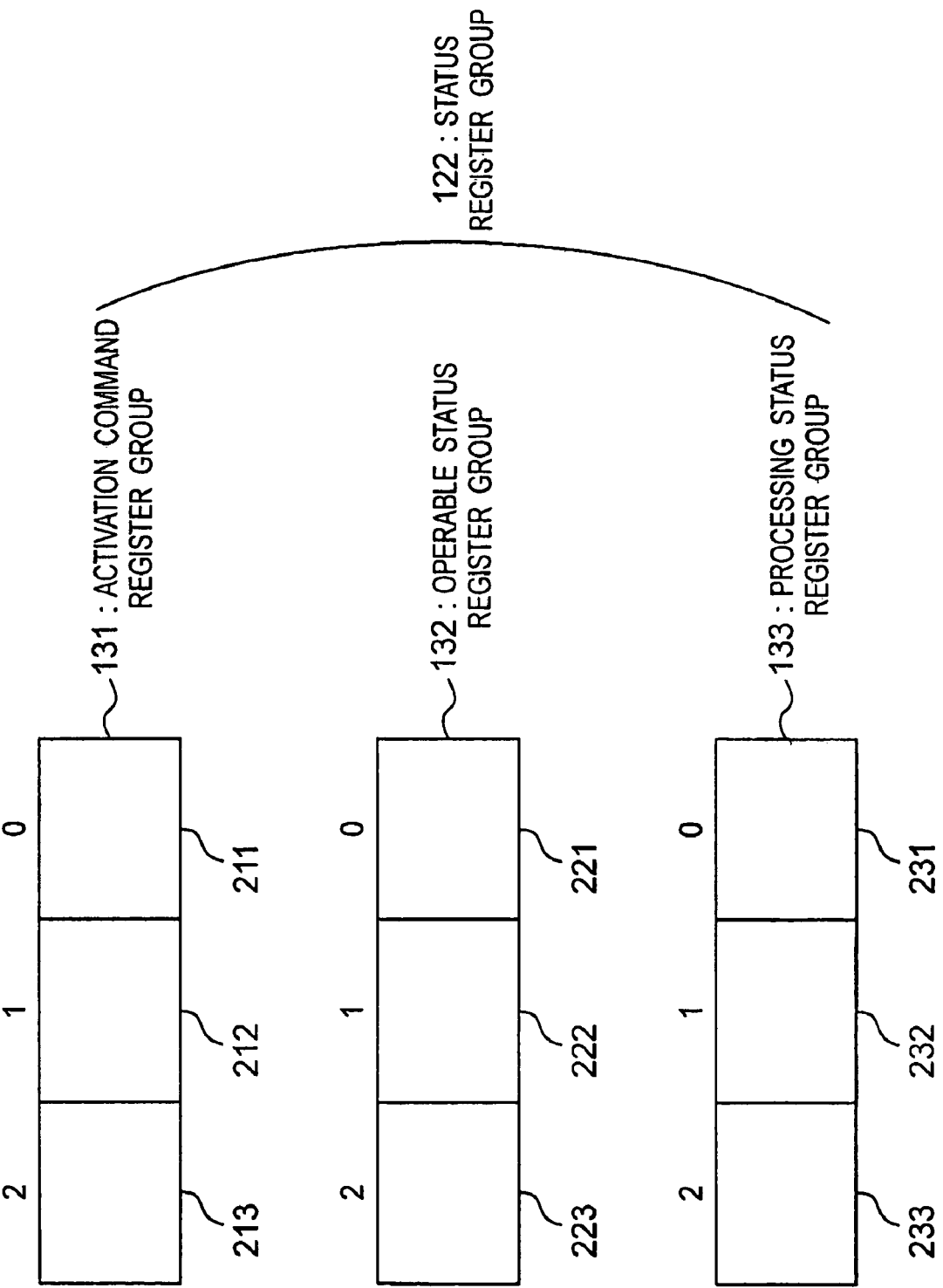
FIG. 2 is a diagram showing a configuration of a status register group of the multifunctional IC card according to the first implemental example of the present invention.
Figure 15:
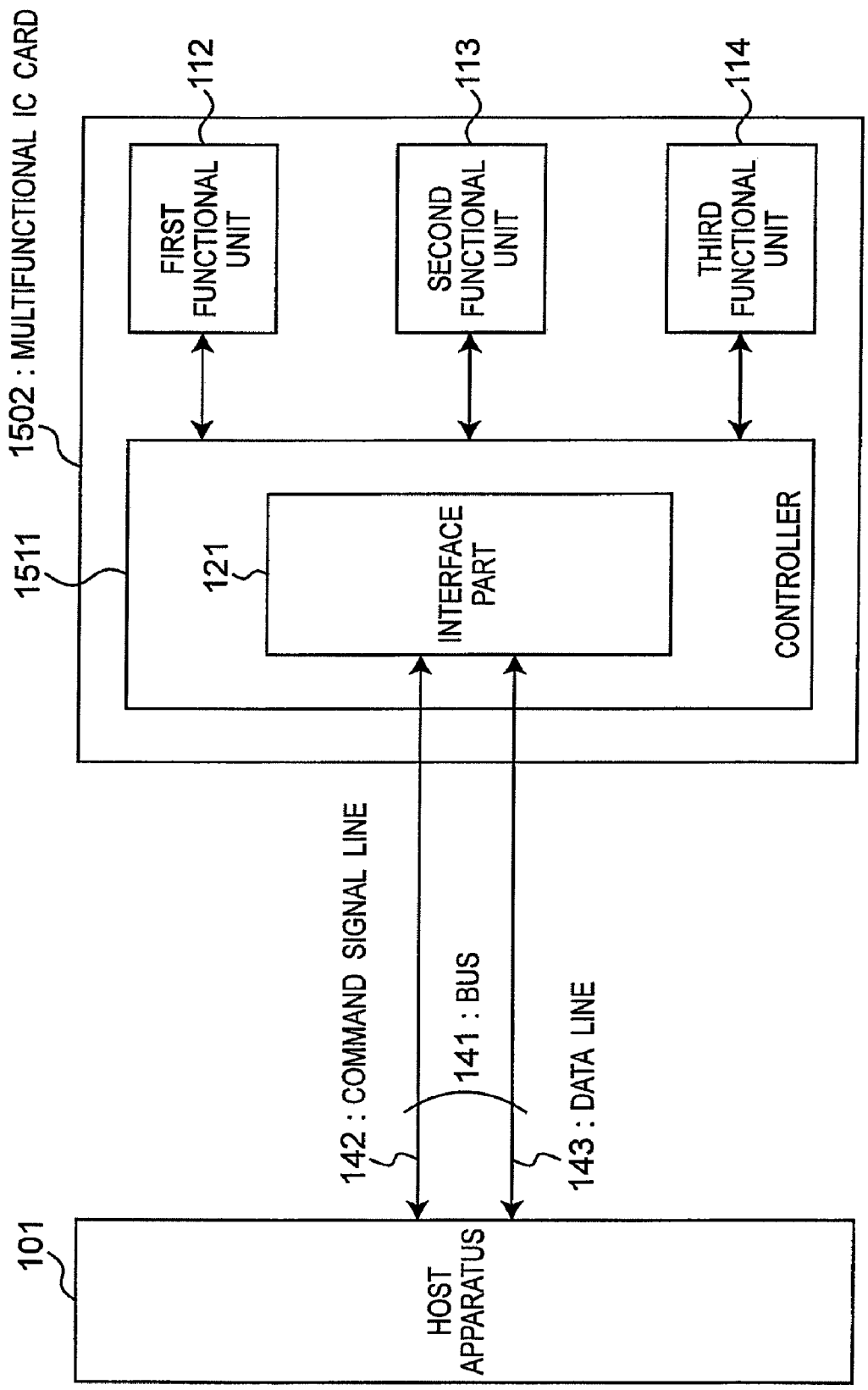
FIG. 15 is a block diagram of a configuration of a multifunctional IC card according to the prior art.

Referring to FIGS. 1 and 2, a configuration of the electronic apparatus according to the first implemental example will be described. FIG. 1 is a block diagram showing a configuration of a host apparatus 101 and that of a multifunctional IC card 102 according to the first implemental example. The host apparatus 101 according to the first implemental example is the same as the host apparatus 101 according to the prior art (FIG. 15). The multifunctional IC card 102 according to the first implemental example has a similar configuration to that of the multifunctional IC card 1502 according to the prior art (FIG. 15).

The multifunctional IC card 102 includes a controller 111 in place of the controller 1511 according to the prior art (FIG. 15). The controller 111 includes an interface unit 121 and a status register group 122. The status register group 122 includes an activation command register group 131, an operable status register group 132, and a processing status register group 133. The multifunctional IC card 102 according to the first implemental example differs from that according to the prior art (FIG. 15) in that the status register group 122 is added to the controller 111.

The multifunctional IC card 102 is the same as that according to the prior art (FIG. 15) in the other respects. Referring to FIG. 1, the same blocks are denoted by the same reference numerals as those according to the prior art (FIG. 15), respectively. The descriptions of the same blocks as those of the prior art are omitted.

The host apparatus 101 and the multifunctional IC card 102 perform a master-slave communication. The host apparatus 101 serves as a master, and the multifunctional IC card 102 serves as a slave. Concretely, the multifunctional IC card 102 includes a plurality of functional units. The host apparatus and the respective functional units communicate with each other via a common interface independently of one another (which means a fundamental communication form, and which does not exclude, for example, in which the host apparatus transmits a common command addressed to a plurality of functional units).

A method of communicating the host apparatus 101 with the multifunctional IC card 102 will be described. The host apparatus 101 transmits a command with a destination of any one of the functional units (e.g., a first functional unit 112) via a command signal line 142. The interface unit 121 of the controller 111 receives the command. The controller 111 transfers the command to the destination functional unit. The functional unit receives the command, generates a response to the command, and transmits the generated response to the controller 111. The controller 111 transmits the received response to the host apparatus 101 via the command signal line 142.

Data is often added to the command or the response. Most of the data is transmitted to the destination via a data line 143. Data including status information (which is three-bit data in each implemental example) of the activation command register group 131, the operable status register group 132, and the processing status register group 133, is transmitted via the command data line 142. The number of data lines 143 may be one or more.

In the first implemental example, when the controller 111 receives the command from the host apparatus 101, then the controller 111 detects the destination of the command, and transmits the command to the destination functional unit. Alternatively, when receiving the command from the host apparatus 101, the controller 111 may transmit the command to all of functional units 112 to 114. In this case, each functional unit selects, fetches, and executes only the command addressed to the functional unit.

Referring to FIG. 1, the controller 111 is connected to the respective functional units 112 to 114 by different communication lines. Each of the communication lines is constituted by a bus according to a communication i/f of the corresponding functional unit and a dedicated line (status information line) for transmitting status information on the corresponding functional unit. A bus having the same configuration as that of the bus 141 is used to communicate commands, responses, and data between the host apparatus 101 and each of the functional units 112 to 114. The status information line will be described later.

Alternatively, the controller 111 may be connected to the respective functional units 112 to 114 by a common bus (having the same configuration as that of the bus 141) (for transmitting the status information as well as the other information via the common bus).

FIG. 2 is a diagram showing a configuration of the status register group 122 of the multifunctional IC card according to the first implemental example of the present invention.

The activation command register group 131 is constituted by an activation command register 211 corresponding to the first functional unit 112, an activation command register 212 corresponding to the second functional unit 113, and an activation command register 213 corresponding to the third functional unit 114. When the activation command registers 211 to 213 corresponding to the respective functional units are set to zero, the registers indicate that the host apparatus 101 has not transmitted an activation command to each functional unit or the host apparatus 101 transmits a stop command thereto. When the activation command registers 211 to 213 corresponding to the respective functional units are set to one, the registers indicate that the host apparatus 101 has transmitted an activation command to each functional unit.

At the timing of power-on of the multifunctional IC card 102, the controller 111 sets all the activation command registers 211 to 213 of the status register group 122 to zero (stop). Each functional unit remains non-activated.

The operable status register group 132 is constituted by an operable status register 221 corresponding to the first functional unit 112, an operable status register 222 corresponding to the second functional unit 113, and an operable status register 223 corresponding to the third functional unit 114. When the operable status registers 221 to 223 corresponding to the respective functional units are set to zero, the registers indicate that each functional unit is not activated yet or is being activated (inoperable state). When the operable status registers 221 to 223 corresponding to the respective functional units are set to one, the registers indicate that each functional unit is completed with activation (operable state).

Each of the functional units 112 to 114 transmits its status information (information as to whether the functional unit is operable or inoperable) to the controller 111 via the corresponding status information line. The controller 111 sets the corresponding registers 221 to 223 depending on the status information on the respective functional units 112 to 114.

The processing status register group 133 is constituted by a processing status register 231 corresponding to the first functional unit 112, a processing status register 232 corresponding to the second functional unit 113, and a processing status register 233 corresponding to the third functional unit 114. When the processing status registers 231 to 233 corresponding to the respective functional units are set to zero, the registers indicate that each functional unit is in a Function-Being-Processed State. When the processing status registers 231 to 233 corresponding to the respective functional units are set to one, the registers indicate that each functional unit is in a Function-Unprocessed State.

Each of the functional units 112 to 114 transmits status information (information as to whether the functional unit is in a Function-Being-Processed State or a Function-Unprocessed State) to the controller 111 via the corresponding status information line. The controller 111 sets the corresponding processing status registers 231 to 233 depending on the status information on the respective functional units 112 to 114.

Alternatively, the respective functional units 112 to 114 may directly set the corresponding operable status registers 221 to 223 and the corresponding processing status registers 231 to 233.

The host apparatus 101 can transmits a read command for the status register group 122 to the controller 111 to acquire a status of the status register group 122 as a response from the controller 111.

Figure 3:
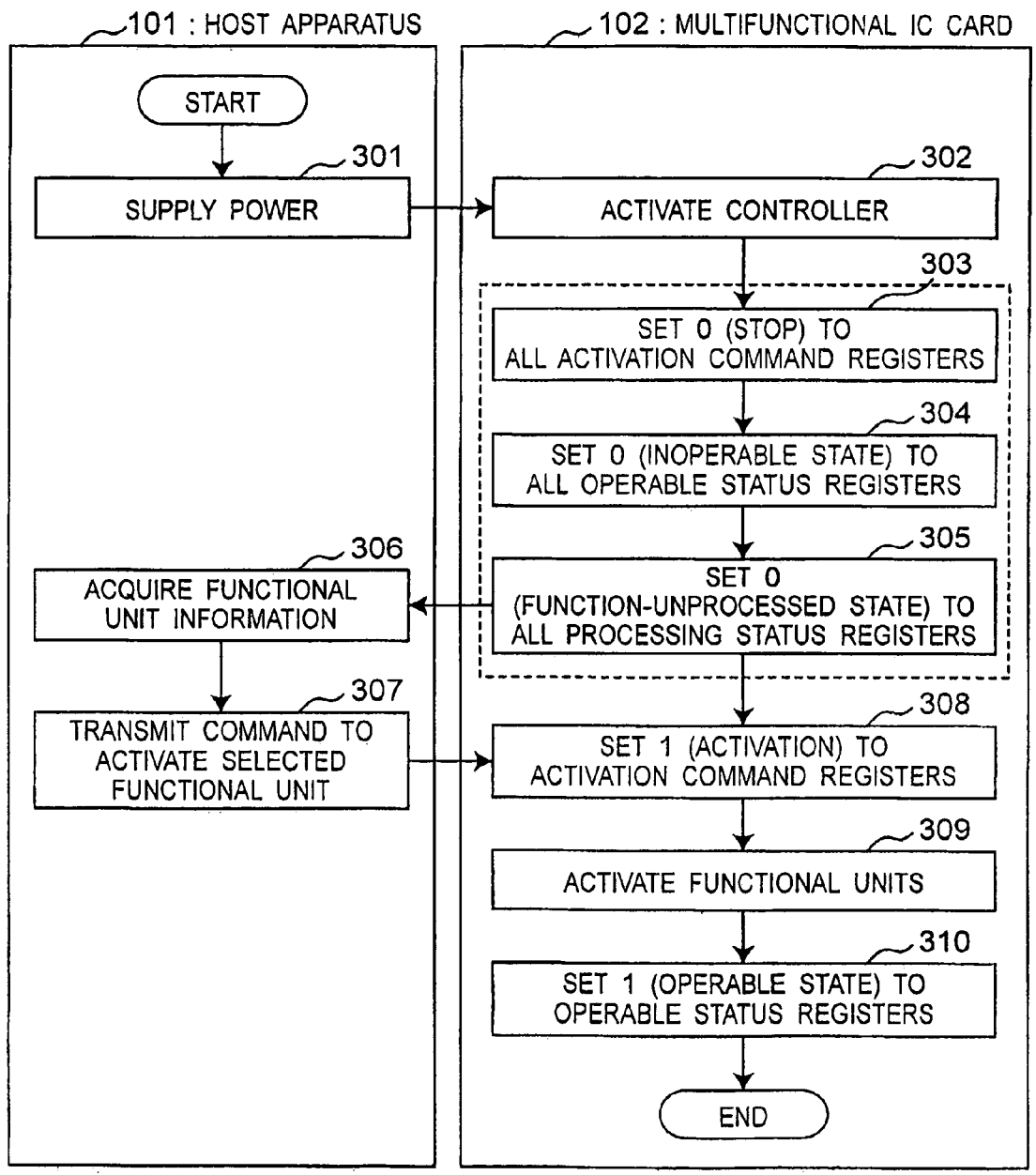
FIG. 3 is a flowchart of an activating method of the multifunctional IC card according to the first implemental example of the present invention.

Referring next to FIGS. 3 to 7, the method of controlling the electronic apparatus according to the first implemental example of the present invention will be described. FIG. 3 is a flowchart of an activating method of the multifunctional IC card according to the first implemental example of the present invention. When the host apparatus 101, onto which the multifunctional IC card 102 is mounted, is powered on or the multifunctional IC card 102 is inserted into the host apparatus 101, the host apparatus 101 supplies an electric power to the multifunctional IC card 102 via the bus 141 (the power line and the ground line) at step 301. At step 302, the controller 111 of the multifunctional IC card 102 is automatically activated. At step 303, the controller 111 sets all activation command registers 211 to 213 to zero (stop). At step 304, the controller 111 sets all operable status registers 221 to 223 to zero (inoperable state). At step 305, the controller 111 sets all processing status registers 231 to 233 to zero (Function-Unprocessed State). The steps 303 to 305 are an initial setting of the status registers 122. After the controller 111 is completed with activation, the host apparatus 101 is communicable with the multifunctional IC card 102.

At step 306, the host apparatus 101 inquires what types of functional units the multifunctional IC card 101 includes. Concretely, the controller 111 has information on all the functional units included in the multifunctional IC card 102, and the host apparatus 101 acquires the information on the functional units from the controller 111. At step 307, the host apparatus 101 selects a functional unit to be used based on the functional unit information acquired at step 306 (or a user may designate the functional unit to be used via an operation unit of the host apparatus 101). In addition, the host apparatus 101 transmits an activation command to activate the selected functional unit (a command to write the activation command register group 131) to the multifunctional IC card 102.

At step 308, the controller 111 of the multifunctional IC card 102 rewrites the activation command register corresponding to the functional unit instructed to be operated from the host apparatus 101, to one (activation) based on the received activation command. At step 309, the controller 111 transmits the activation command to the functional unit, for which the corresponding activation command register is rewritten to one (activation), via a communication line. The functional unit that receives the activation command transmits an ACK response to the controller 111, and activation of the functional unit is started. At step 310, when the controller 111 recognizes that the functional unit turns into an activation completion state (operable state) via a status information line after receiving the ACK response to the activation command, the controller 111 rewrites the operable status register corresponding to the functional unit to one (operable state).

Figure 4:
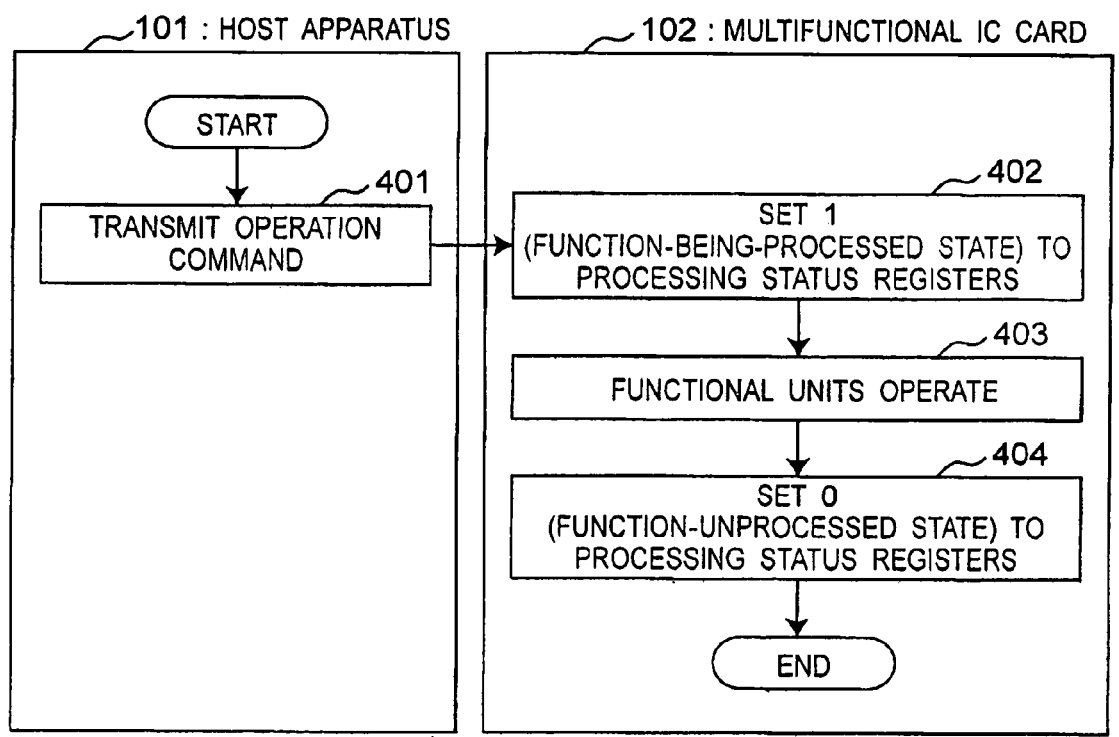
FIG. 4 is a flowchart of an operating method of the multifunctional IC card according to the first implemental example of the present invention.

FIG. 4 is a flowchart of an operation method of the multifunctional IC card according to the first implemental example of the present invention. At step 401, the host apparatus 101 transmits an operation command to operate the functional unit completed with activation (the operable functional unit) to the multifunctional IC card 102. At step 402, when the controller 111 recognizes that the functional unit turns into a processing state via the status information line, the controller 111 rewrites the processing status register corresponding to the functional unit, for which the operation command is transmitted from the host apparatus 101, to one (Function-Being-Processed State). At step 403, the functional unit that receives the operation command transmits an ACK response to the controller 111, and starts operating. At step 404, when the controller 111 recognizes that the functional unit turns an operation finished/suspended state (function-non-processing) via the status information line, the controller 111 rewrites the processing status register corresponding to the functional unit to zero (function-non-processing).

Figure 5:
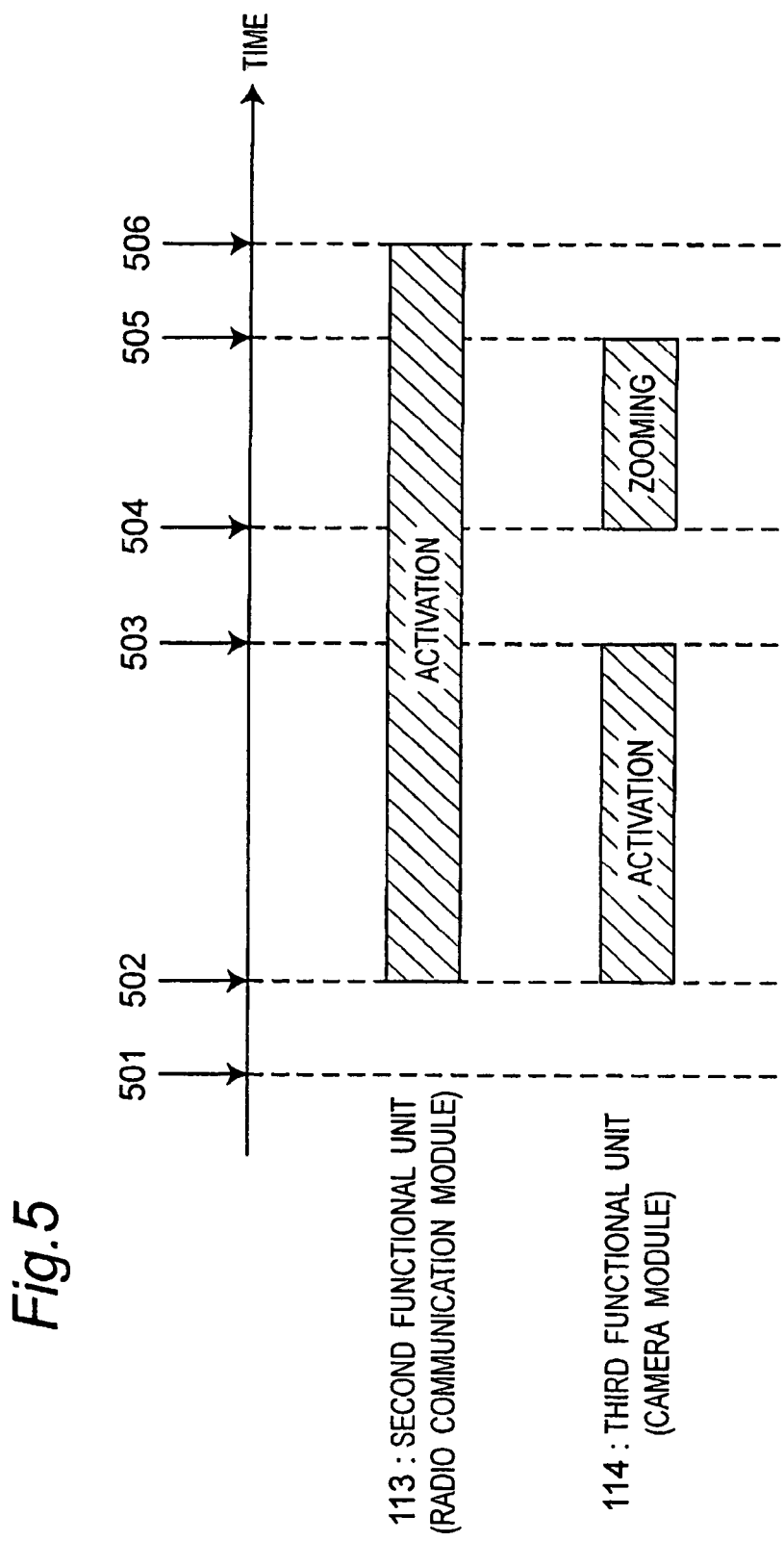
FIG. 5 is a timing chart showing one example of the activating method of the multifunctional IC card and one example of the operating method of the multifunctional IC card according to the first implemental example of the present invention.
Figure 6:
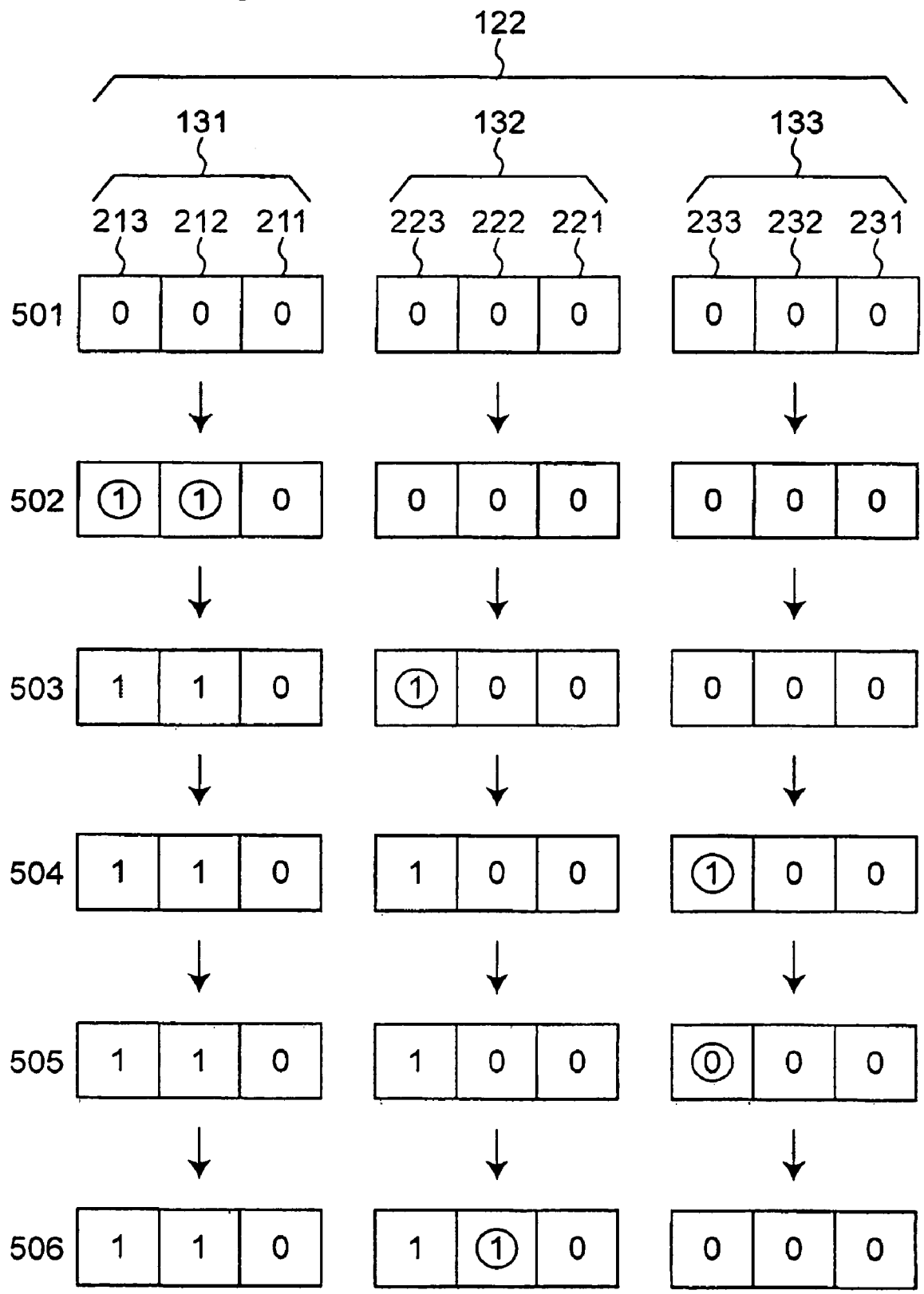
FIG. 6 is a diagram showing status changes of an activation command register group, an operable status register group, and a processing status register group of FIG. 5.

FIG. 5 is a timing chart of one example of the method of activating the multifunctional IC card and one example of the method of causing the multifunctional IC card to operate according to the first implemental example of the present invention. FIG. 6 is a view of status changes of the activation command register group 131, the operable status register group 132, and the processing status register group 133 of FIG. 5. The activation command register group 131, the operable status register group 132, and the processing status register group 133 with reference numerals (timings) 501 to 506 shown in FIG. 6 show states of the activation command register group 131, the operable status register group 132, and the processing status register group 133 at the timing indicated by the same reference numerals of FIG. 5, respectively. Referring to FIG. 6, an updated register value is surrounded by a circle.

A case in which the host apparatus 101 selects the second functional unit (the radio communication module) 113 and the third functional unit (camera module) 114 as the functional units to be used (at step 307) will be described below.

At the timing 501, the status register group 122 is initialized. Concretely, the activation command registers 211 to 213 are set to zero (stop). The operable status registers 221 to 223 are set to zero (inoperable state). The processing status registers 231 to 233 are set to zero (function-non-processing) (at steps 303 to 305).

At the timing 502, the activation command register 212 corresponding to the second functional unit (the radio communication module) 113 and the activation command register 213 corresponding to the third functional unit (camera module) 114 are rewritten to one (activation) based on the activation command from the host apparatus 101 (at step 308). The activation command register 211 corresponding to the first functional unit remains zero (stop). The second functional unit (the radio communication module) 113 and the third functional unit (camera module) 114 start operating (at step 309). At this time, all the operable status registers 221 to 223 are set to zero (inoperable state). A processing for activating the second functional unit (the radio communication module) 113 includes a processing for searching a counterpart for communicating with each other. Therefore, an activation time of the second functional unit (the radio communication module) 113 is normally far longer than that of the third functional unit (camera module) 114.

At the timing 503, the third functional unit (camera module) 114 is completed with activation. The operable status register 223 corresponding to the third functional unit (camera module) 114 is rewritten to one (operable state) (at step 310). This leads to that the host apparatus 101 can confirm that the activation of the third functional unit (camera module) 114 is completed by inquiring the status register group 122.

At the timing 504, the host apparatus 101 transmits a zooming command (an operation command) to the third functional unit (camera module) 114. The processing status register 233 corresponding to the third functional unit (camera module) 114 is rewritten to one (Function-Being-Processed State) (at step 402). Even while the second functional unit (the radio communication module) 113 is active, the third functional unit (camera module) 114 performs zooming (operates).

At the timing 505, the zooming of the third functional unit (camera module) 114 is finished. The processing status register 233 corresponding to the third functional unit (camera module) 114 is rewritten to zero (function-non-processing) (at step 404).

At the timing 506, the second functional unit (the radio communication module) 113 is completed with activation. The operable status register 222 corresponding to the second functional unit (the radio communication module) 113 is rewritten to one (operable state) (at step 310). Thereafter, the second functional unit (the radio communication module) 113 and the third functional unit (camera module) 114 operate based on the commands from the host apparatus 101, respectively.

Figure 7:
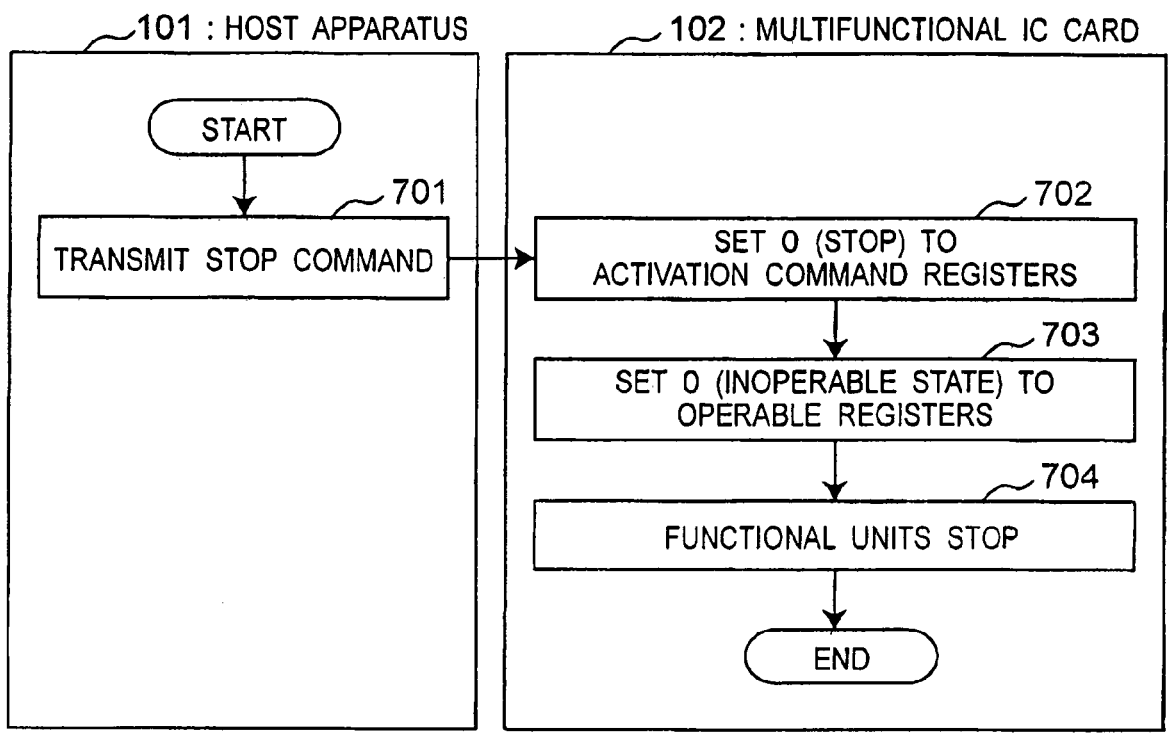
FIG. 7 is a flowchart of a stopping method of the multifunctional IC card according to the first implemental example of the present invention.

FIG. 7 is a flowchart of a stopping method of the multifunctional IC card according to the first implemental example of the present invention. At step 701, the host apparatus 101 transmits a stop command to the multifunctional IC card 102 to stop each functional unit that is in the operable state. At step 702, the controller 111 rewrites the activation command register corresponding to each functional unit, for which the host apparatus 101 transmits the stop command, to zero (inoperable state), based on the received stop command. At step 703, the controller 111 rewrites the operable status register corresponding to each functional unit, for which the host apparatus 101 transmits the stop command, to zero (inoperable state). At step 704, the functional unit that receives the stop command transmits an ACK response to the controller 111, and stops the activation thereof.

In the present implemental example, each of the activation command registers, the operable status registers, and the processing status registers is represented by one-bit data of one or zero. However, the present invention is not limited to this.

In the present implemental example, the case in which two out of the three functional units are activated in the multifunctional IC card has been described. The number of functional units included in the multifunctional IC card is not limited to three. In addition, the host apparatus 101 can activate any number of functional units at any timing.

In the present implemental example, the controller (including the common functional unit) is activated and then the functional unit (units) to be used is (are) activated. The electric power consumption of the multifunctional IC card in which only the controller is activated, is far lower than that of the multifunctional IC card in which all of the functional units are activated. By performing the two-stage activation and not activating unnecessary functional units, electric power can be saved.

In the present implemental example, the multifunctional IC card is configured to include the status register group, and the host apparatus acquires the status information on the status register group to recognize the activation status of each functional unit. Therefore, in the multifunctional IC card including a plurality of functional units having a different activation time, the functional unit having the short activation time can execute its processing without waiting the completion of the activation of the functional unit having the longest activation time.

In the present implemental example, when a plurality of functional units to be used is provided, the functional units are simultaneously activated at step 309. Alternatively, the controller may sequentially activate the functional units one by one in such a manner, for example, that when the activation of one functional unit is completed, the activation of the next functional unit is started. This leads to that a high activation current from the host apparatus to the multifunctional IC card at a breath can be prevented. Even if the host apparatus is an apparatus that operates at limited power such as a portable terminal, the host apparatus does not bear a heavy burden of the power. Therefore, the multifunctional IC card can operate stably.

The controller may be configured not to include the activation command register group but to include only the operable status register group and the processing status register group. In this case, the host apparatus transmits an activation command to each functional unit.

SECOND IMPLEMENTAL EXAMPLE

Referring to FIGS. 8 to 13, an electronic apparatus and a method of controlling the electronic apparatus according to the second implemental example of the present invention will be described.

Figure 8:
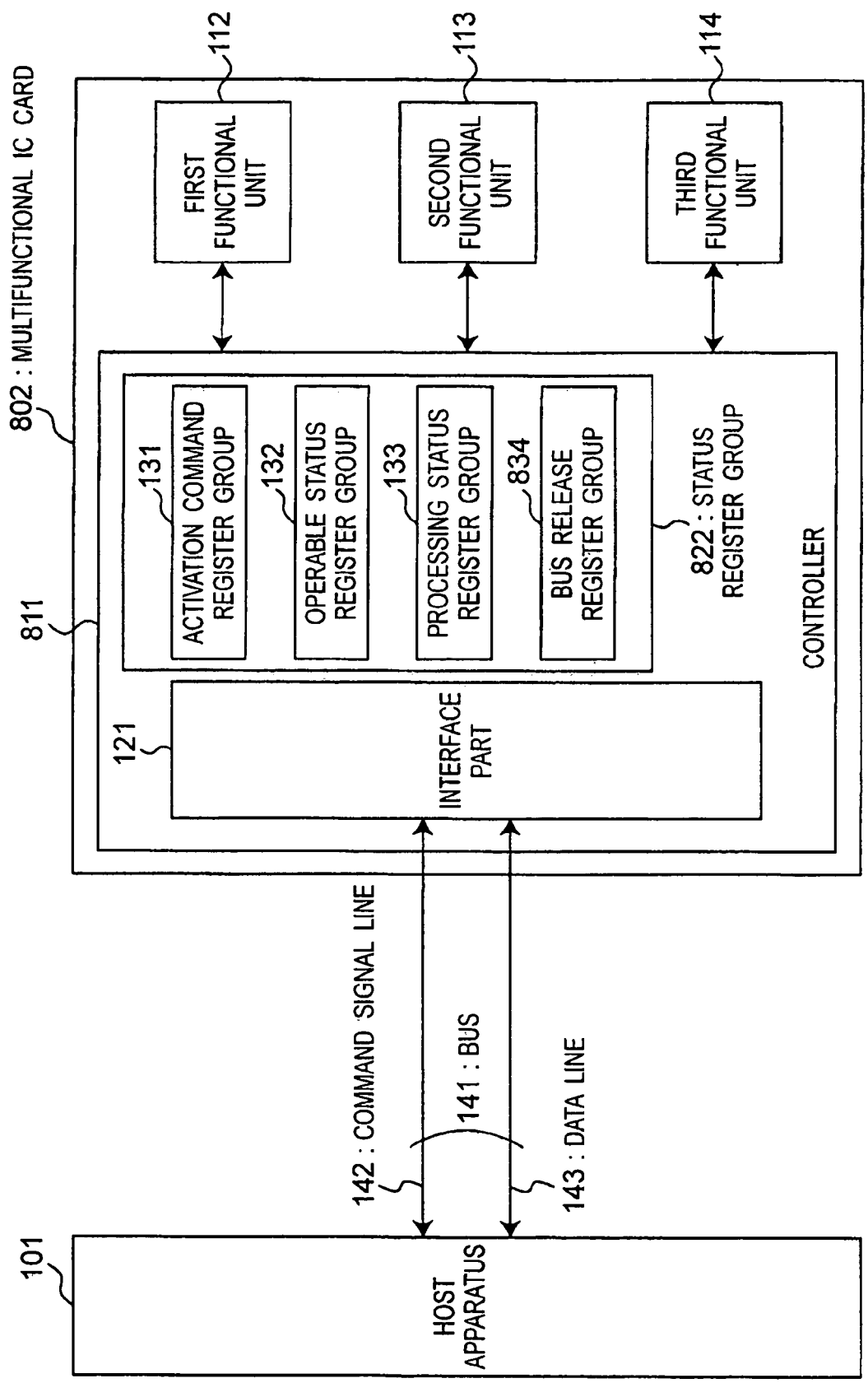
FIG. 8 is a block diagram showing a configuration of a host apparatus and that of a multifunctional IC card according to a second implemental example of the present invention.
Figure 9:
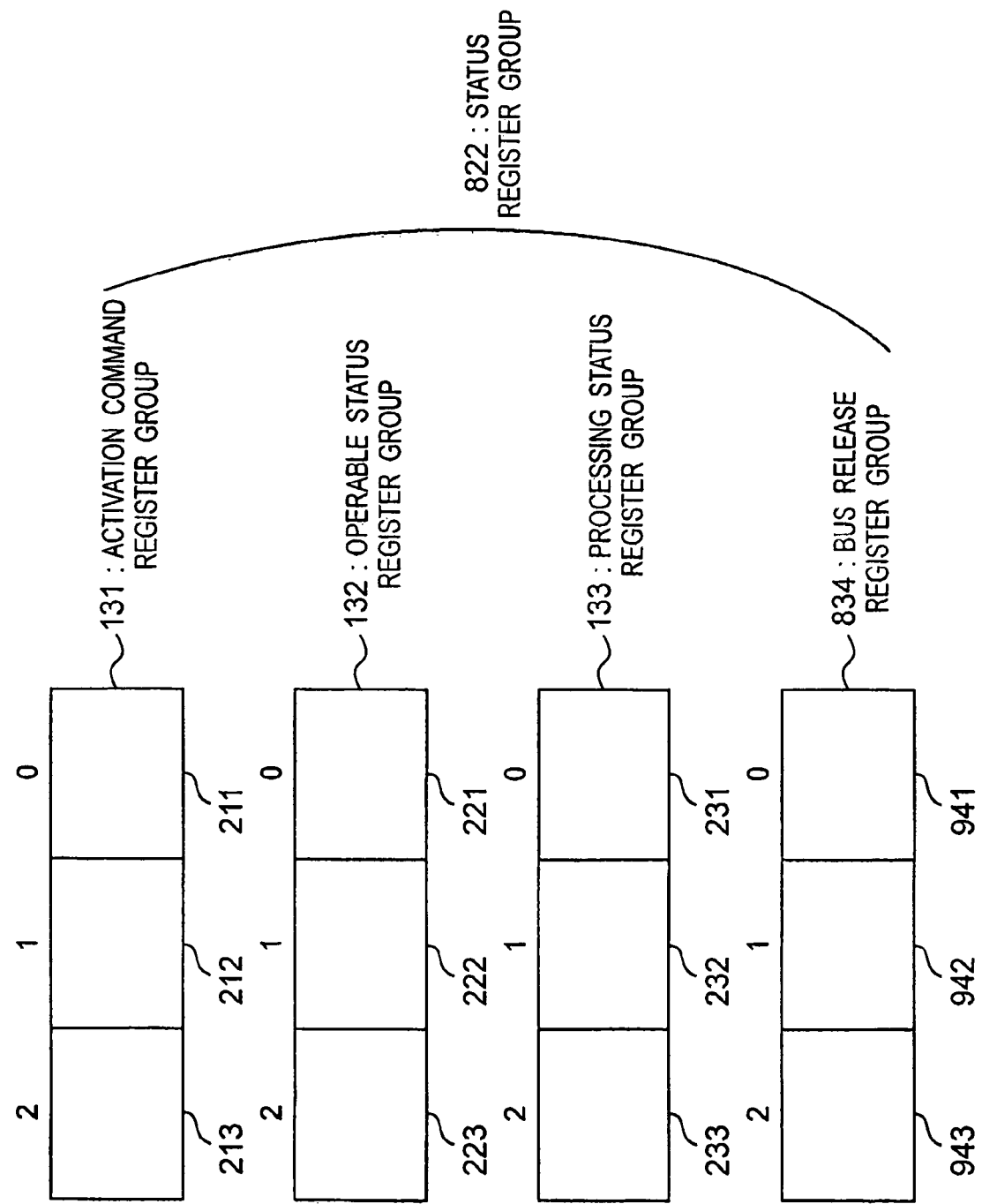
FIG. 9 is a diagram showing a configuration of a status register group of the multifunctional IC card according to the second implemental example of the present invention.

Referring to FIGS. 8 and 9, a configuration of the electronic apparatus according to the second implemental example of the present invention will be described. FIG. 8 is a block diagram showing a configuration of a host apparatus 101 and that of a multifunctional IC card 802 according to the second implemental example of the present invention. The host apparatus according to the second implemental example has the same configuration as that of the host apparatus 101 of the first implemental example (FIG. 1). The multifunctional IC card 802 according to the second implemental example has a similar configuration to that of the multifunctional IC card 102 according to the first implemental example (FIG. 1).

The multifunctional IC card 802 includes a controller 811 in place of the controller 111 according to the first implemental example (FIG. 1). The controller 811 includes an interface part 121 and a status register group 822. The status register group 822 includes an activation command register group 131, an operable status register group 132, a processing status register group 133, and a bus release register group 834. The multifunctional IC card 802 according to the second implemental example differs from the multifunctional IC card 102 according to the first implemental example (FIG. 1) in that the bus release register group 834 is additionally included in the status register group 822.

The multifunctional IC card 802 according to the second implemental example is the same as that according to the first implemental example (FIG. 1) in the other respects. Referring to FIG. 6, the same blocks as those of the first implemental example (FIG. 1) are denoted by the same reference numerals, respectively. The descriptions of the same blocks as those according to the first implemental example will be omitted.

The host apparatus 101 serves as a master, and the multifunctional IC card 802 serves as a slave. The host apparatus 101 and the multifunctional IC card 802 perform a master-slave communication. The master-slave communication has been already described in detail in the first implemental example.

FIG. 9 is a diagram showing a configuration of the status register group 822 of the multifunctional IC card.

The activation command register group 131, the operable status register group 132, and the processing status register group 133 are the same as those described in the first implemental example. The bus release register group 834 is constituted by a bus release register 941 corresponding to the first functional unit 112, a bus release register 942 corresponding to the second functional unit 113, and a bus release register 943 corresponding to the third functional unit 114.

When the bus release registers 941 to 943 corresponding to the respective functional units are set to zero, the registers indicate that no bus release command is transmitted from the host apparatus 101 to each functional unit. That is, the registers indicate that the interface part 121 is in a state in which the interface part 121 can output a busy signal resulting from the fact that each corresponding functional unit is busy (cannot respond to a command from the host apparatus 101).

When the bus release registers 941 to 943 corresponding to the respective functional units are set to one, the registers indicate that a bus release command is transmitted from the host apparatus 101 to each function unit. In addition, the registers indicate that the interface part 121 is in a state in which the interface part 121 cannot output a busy signal resulting from the fact that each corresponding functional unit is busy.

At the timing of power-on of the multifunctional IC card 802, the controller 811 sets all the bus release registers 941 to 943 of the bus release register group 834 to zero. The interface part 121 can output a busy signal resulting from the fact that any functional unit is busy.

When the host apparatus 101 transmits a write command for the bus release register group 834 (a command to prohibit the interface part 121 from outputting a busy signal resulting from the fact that the functional unit designated by the host apparatus 101 is busy, and to release the bus) to the controller 111, the controller 111 rewrites a state of the bus release register group 834 according to the write command. Concretely, the bus release register corresponding to the functional unit for which the host apparatus 101 prohibits a busy signal from outputted resulting from the fact that the functional unit is busy, is rewritten to one.

Even if the functional unit corresponding to the bus release register set to one becomes busy, the interface part 121 does not output a busy signal. The interface part 121 outputs a busy signal only if the functional unit which is in a busy state and which corresponds to the bus release register set to zero (bus unreleased, i.e., a busy signal can be outputted) exists.

Figure 10:
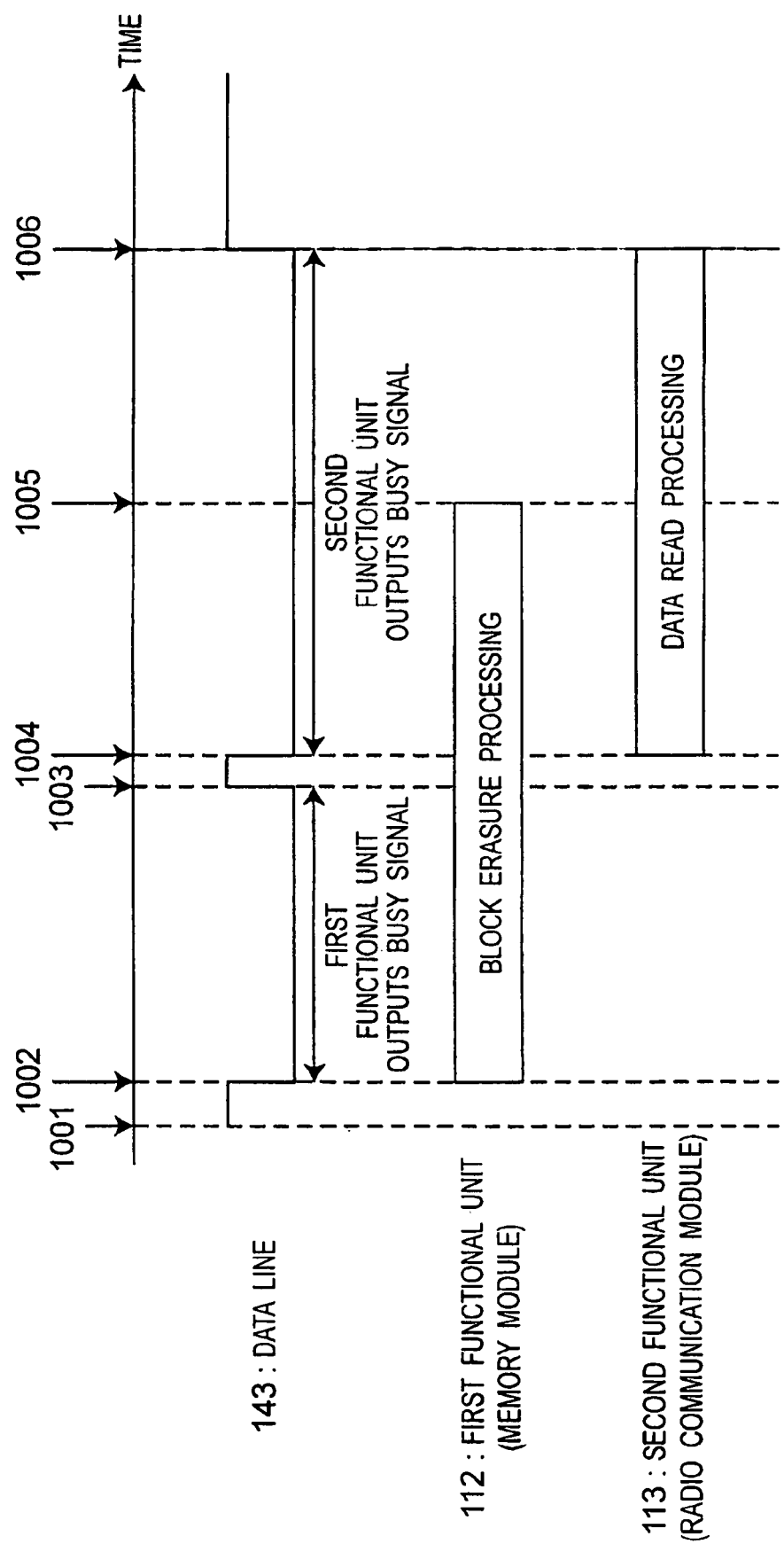
FIG. 10 is a timing chart 1 of one example of a parallel processing method of functional units of the multifunctional IC card according to the second implemental example of the present invention.
Figure 11:
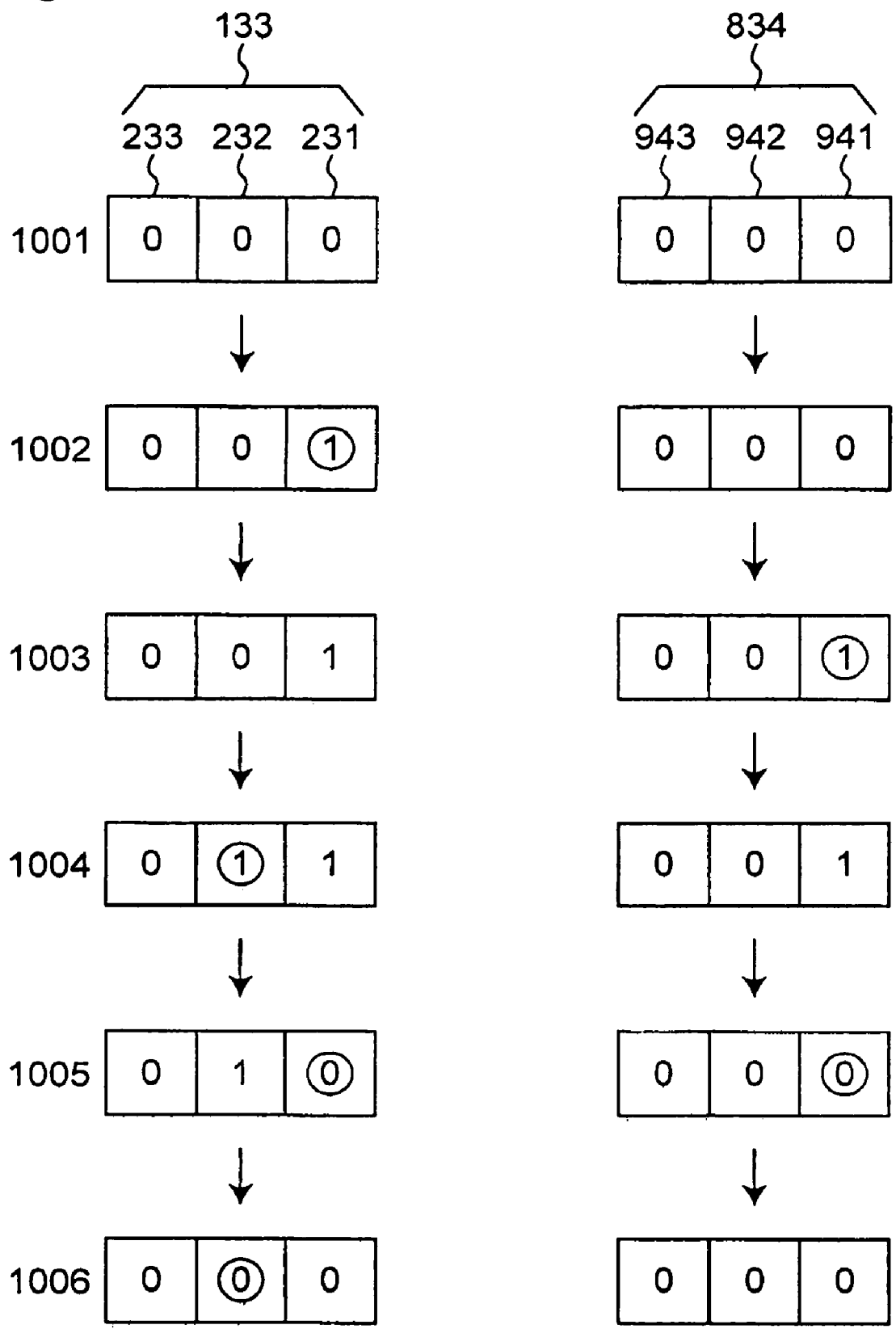
FIG. 11 is a diagram showing status changes of a processing status register group and a bus release register group of FIG. 10.

Referring to FIGS. 10 to 13, the method of controlling the electronic apparatus according to the second implemental example of the present invention will be described. FIG. 10 is a timing chart 1 of one example of a parallel processing method of the functional units of the multifunctional IC card according to the second implemental example of the present invention. FIG. 11 is a diagram showing status changes of the processing status register group and the bus release register group of FIG. 10. The processing status register group 133 and the bus release register group 834 with reference numerals (timing) 1001 to 1006 shown in FIG. 10 show states of the processing status register group 133 and the bus release register group 834 at the timings indicated by the same reference numerals of FIG. 10, respectively. Referring to FIG. 11, an updated register value is surrounded by a circle.

A case in which the first functional unit (the memory module) 112 starts a block erasure processing while all of the functional units 112 to 114 do not perform processings, and in which the second functional unit (the radio communication module) 113 performs a read processing during the block erasure processing will be described.

At the timing 1001, since all of the functional units do not perform processings, the processing status registers 231 to 233 are all set to zero (Function-Unprocessed State), and the bus release registers 941 to 943 are all set to zero.

At the timing 1002, the host apparatus 101 transmits a block erasure command via the command signal line 142. The first functional unit (the memory module) 112 transmits a response to the host apparatus 101 via the command signal line 142 and starts the block erasure processing. The first functional unit (the memory module) 112 outputs a busy signal to the host apparatus 101 via the interface part 121 and the data line 143 (the data line 143 turns Low level). The processing status register 231 corresponding to the first functional unit (the memory module) 112 is rewritten to one (Function-Being-Processed State).

A request command for status information on the status register group 822 and a response to the request command (including data on the status information on the status register group 822) are all transmitted via the command signal line 142. Even while the data line 143 is occupied by the busy signal, the host apparatus 101 inquires the controller 811 of the status information on the status register group 822 to recognize that the first functional unit 112 is in a Function-Being-Processed State (the processing status register here is set to one) and that the busy signal is outputted via the data line 143 resulting from the fact.

At the timing 1003, the host apparatus 101 transmits a bus release command (a write command for the bus release register group 834) via the command signal line 142. The controller 611 transmits a response via the command signal line 142. The bus release register 941 corresponding to the first functional unit (the memory module) 112 is rewritten to one (bus released). The interface part 121 stops outputting the busy signal based on the bus release register group 834 (the data line 123 turns from Low level to High level). By releasing the data line 143, the other functional units 113 and 114 can use the data line 143.

At the timing 1004, based on a data read command from the host apparatus 101, the second functional unit (the radio communication module) 113 starts a data read processing. The second functional unit (the radio communication module) 113 outputs a busy signal to the host apparatus 101 via the interface part 121 and the data line 143 (the data line 123 turns Low level). The processing status register 232 corresponding to the second functional unit (the radio communication module) 113 is rewritten to one (Function-Being-Processed State).

At the timing 1005, the first functional unit (the memory module) 112 completes the block erasure processing. The processing status register 231 corresponding to the first functional unit (the memory module) 112 is rewritten to zero (Function-Unprocessed State). The host apparatus 101 transmits a bus non-release command (a write command for the bus release register group 834) via the command signal line 142. The bus release register 941 corresponding to the first functional unit (the memory module) 112 is rewritten to zero.

At the timing 1006, the second functional unit (the radio communication module) 113 completes the data read processing. The processing status register 232 corresponding to the second functional unit (the radio communication module) 113 is rewritten to zero (Function-Unprocessed State). Since the processing state registers 231 to 233 corresponding to all the functional units are set to zero (Function-Unprocessed State), the interface part 121 stops outputting the busy signal (the data line 143 turns from Low level to High level).

Figure 12:
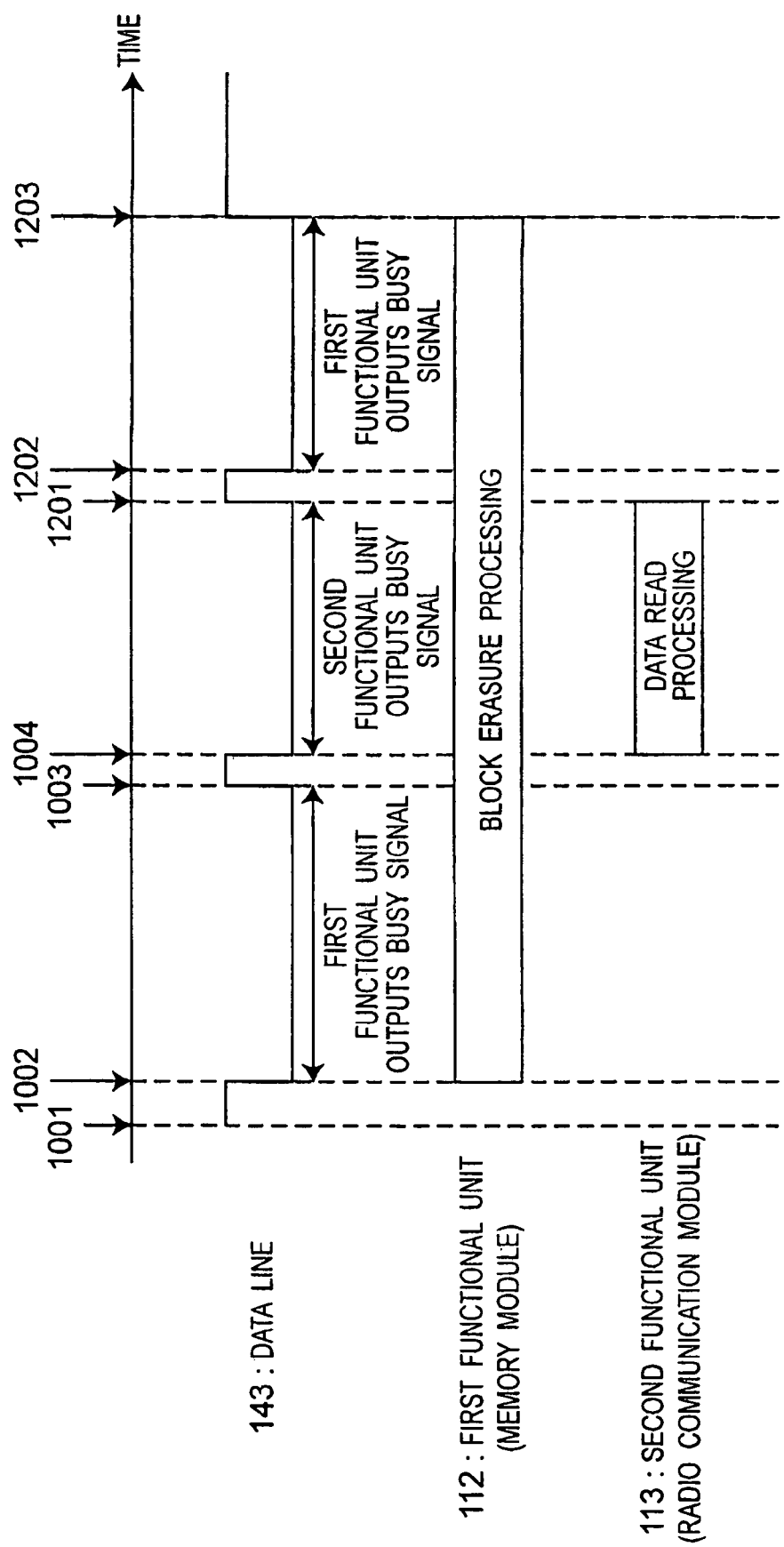
FIG. 12 is a timing chart 2 of one example of the parallel processing method of the functional units of the multifunctional IC card according to the second implemental example of the present invention.
Figure 13:
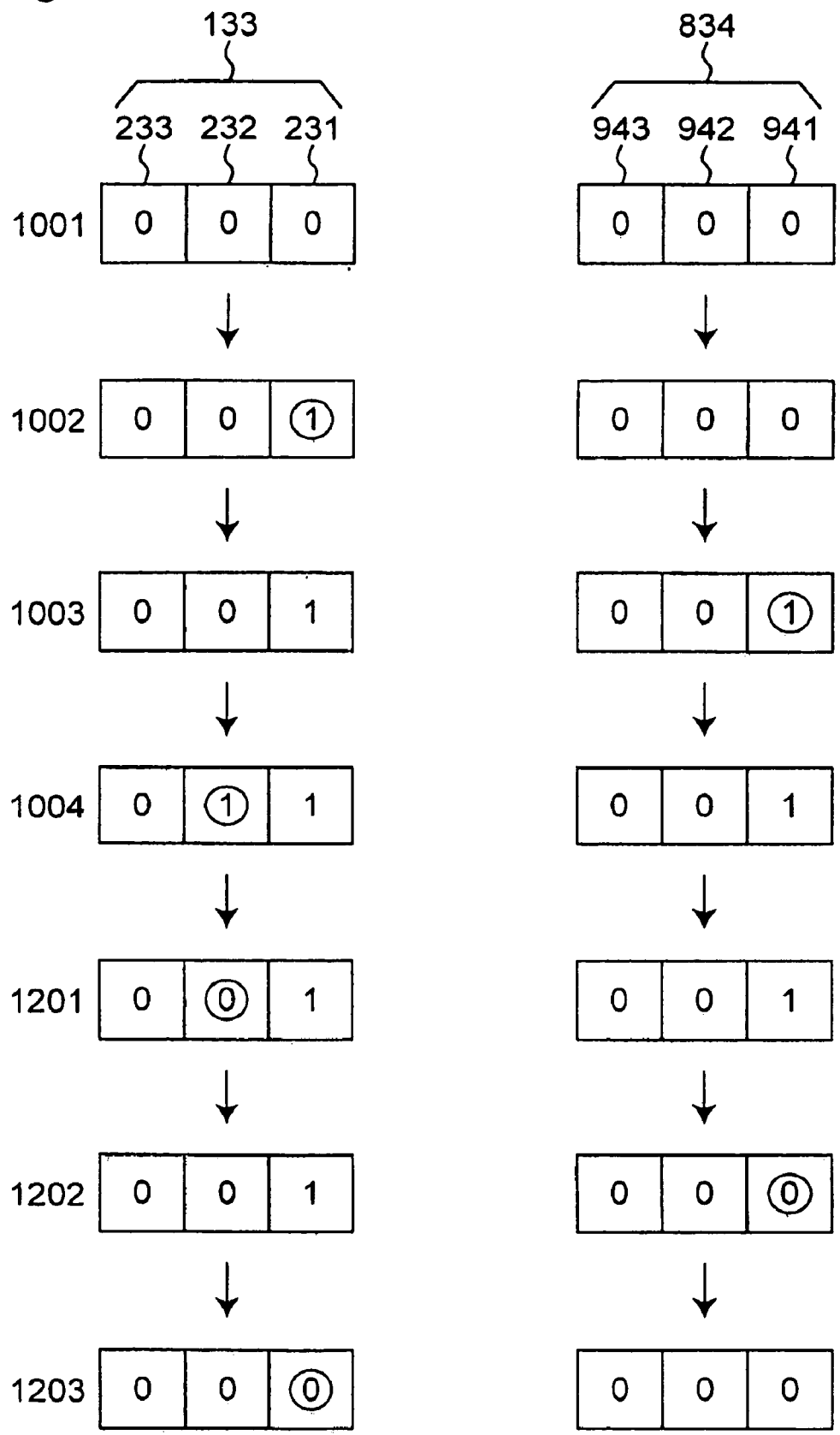
FIG. 13 is a diagram showing status changes of the processing status register group and the bus release register group of FIG. 12.

FIG. 12 is a timing chart 2 of one example of the parallel processing method of the functional units of the multifunctional IC card according to the second implemental example of the present invention. FIG. 13 is a diagram showing status changes of the processing status register group and the bus release register group of FIG. 12. The processing status register group 133 and the bus release register group 834 with reference numerals (timing) 1001 to 1004 and 1201 to 1203 shown in FIG. 13 show states of the processing status register group 133 and the bus release register group 834 at the timing indicated by the same reference numerals of FIG. 12, respectively. Referring to FIG. 13, an updated register value is surrounded by a circle.

Referring to FIG. 10, after the first functional unit (the memory module) 112 completes the block erasure processing at the timing 1005, the second functional unit (the radio communication module) 113 completes the data read processing at the timing 1006. Referring to FIG. 12, after the second functional unit (the radio communication module) 113 completes the data read processing at the timing 1201, the first functional unit (the memory module) 112 completes the block erasure processing at the timing 1203. Since timings 1001 to 1004 of FIG. 12 are the same as those shown in FIG. 10, the descriptions thereof will be omitted.

At the timing 1201, the second functional unit (the radio communication module) 113 completes the data read processing. The processing status register 232 corresponding to the second functional unit (the radio communication module) 113 is rewritten to zero (Function-Unprocessed State). The second functional unit (the radio communication module) 113 outputs a busy signal (the data line 123 turns from Low level to High level).

At the timing 1202, the host apparatus 101 transmits a bus non-release command (a write command for the bus release register group 834) via the command signal line 142. The bus release register 941 corresponding to the first functional unit (the memory module) 112 is rewritten to zero (bus unreleased). At this moment, since the processing status register 231 corresponding to the first functional unit (the memory module) 112 is set to one (Function-Being-Processed State), the interface part 121 outputs a busy signal to the host apparatus 101 via the data line 143 (the data line 123 turns Low level).

At the timing 1203, the first functional unit (the memory module) 112 completes the block erasure processing. The processing status register 231 corresponding to the first functional unit (the memory module) 112 is rewritten to zero (Function-Unprocessed State). The first functional unit (the memory module) 112 stops outputting the busy signal (the data line 123 turns from Low level to High level).

In the present implemental example, the case in which the second functional unit (the radio communication module) 113 performs the read processing while the first functional unit (the memory module) 112 is performing the block erasure processing has been described. However, the present invention is not limited to this case but can be applied to a case in which the other functional unit performs a processing in parallel to the processing of one functional unit.

In the present implemental example, the case in which the processings of the two functional units are performed in parallel in the multifunctional IC card including the three functional units has been described. The present invention can be applied to a multifunctional IC card including, for example, four or more functional units, or to a case in which processings of three or more functional units are performed in parallel.

In the present implemental example, the multifunctional IC card is configured to include the status register group (including the bus release register group), and the host apparatus acquires the status information on the status register group. This leads to that the host apparatus can recognize the processing status of each functional unit. Therefore, even if the busy signal is outputted to the data line, the multifunctional IC card can release the bus, and the data line can be used for the processing of the other functional units. Further, since a plurality of functional units can perform processings in parallel, a total processing time can be shortened.

Alternatively, the status register group including the functions according to the first implemental example (by which functions the host apparatus can easily recognize the activation states of all the functional units) and the status register group including the functions according to the second implemental example (by which functions the host apparatus can easily recognize the operation states of all the functional units) may be provided separately.

The bus release register group may be set as common registers (one bit) to all the functional registers. By setting the bus release register to one irrespectively of to which functional unit occurrence of the busy signal is attributed, output of the busy signal may be completely prohibited.

THIRD IMPLEMENTAL EXAMPLE

Figure 14:
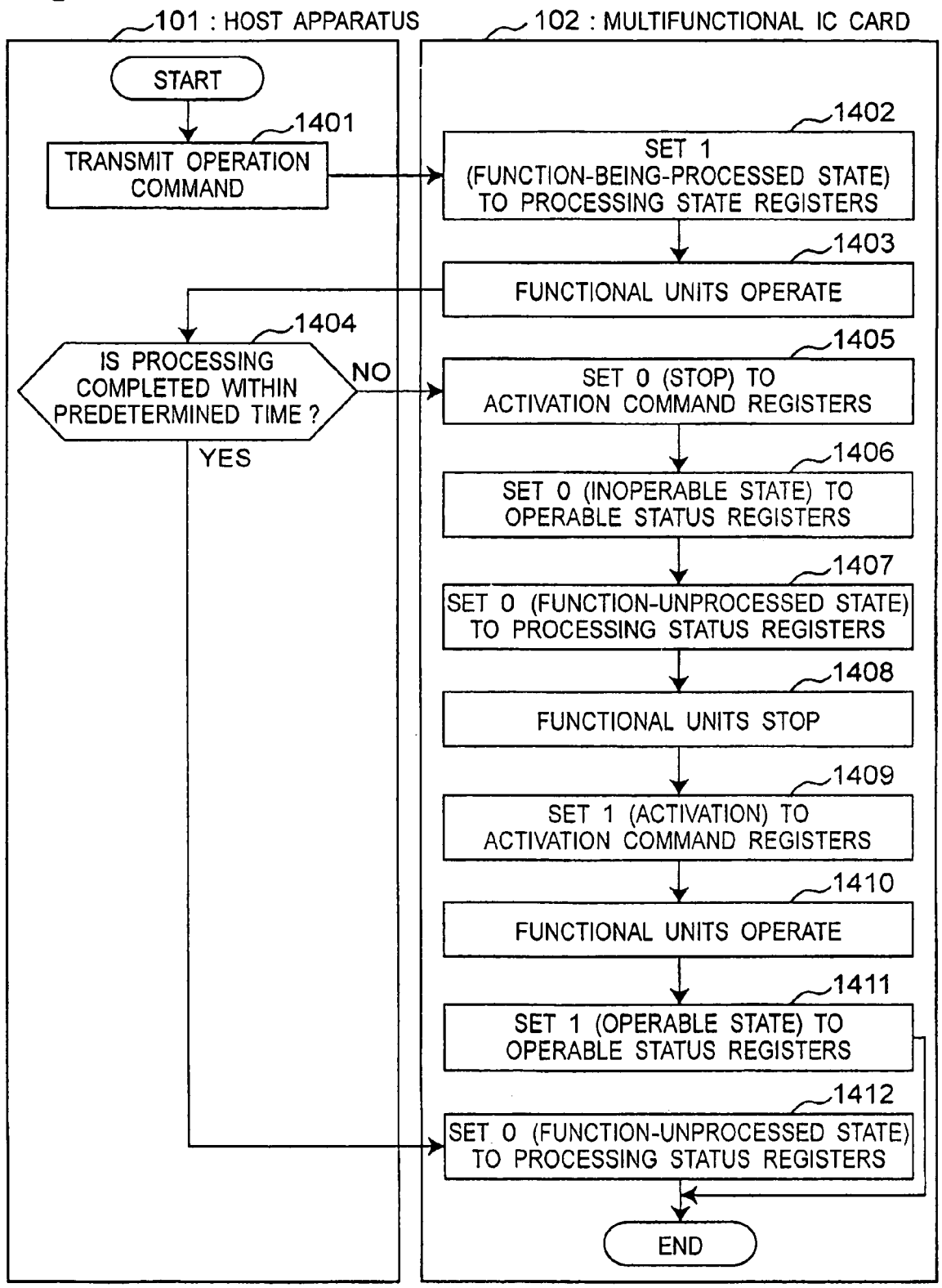
FIG. 14 is a flowchart of a reactivating method when a multifunctional IC card is frozen, according to a third implemental example of the present invention.

Referring to FIGS. 8 and 14, an electronic apparatus and a method of controlling the electronic apparatus according to the third implemental example of the present invention will be described.

Referring to FIG. 8, a configuration of the electronic apparatus according to the third implemental example of the present invention will be described. FIG. 8 is a block diagram showing a configuration of a multifunctional IC card according to the third implemental example of the present invention. The multifunctional IC card according to the third implemental example of the present invention has the same configuration as that of the second implemental example of the present invention (FIG. 8). Therefore, the descriptions thereof will be omitted.

Referring to FIG. 14, the method of controlling the electronic apparatus according to the third implemental example of the present invention will be described. FIG. 14 is a flowchart of a reactivating method of a frozen the multifunctional IC card according to the third implemental example of the present invention.

A case in which, while activation of all functional modules 112 to 114 are completed but the functional modules 112 to 114 do not perform processings, a first functional unit (the memory module) 112 starts a data write processing and the processing is frozen, will be described.

Initially, activation registers 211 to 213 are all set to one (activation), operable status registers 221 to 223 are all set to one (operable state), processing status registers 231 to 233 are all set to zero (Function-Unprocessed State), and bus release registers 941 to 943 are all set to zero.

At step 1401, the host apparatus 101 transmits a data write command to the first functional unit (the memory module) 112. At step 1402, a controller 811 rewrites the processing status register 231 corresponding to the first functional unit (the memory module) 112 to one (Function-Being-Processed State) when recognizing that the first functional unit 112 turns into a Function-Being-Processed State via a status information line. At step 1403, the first functional unit (the memory module) 112 starts the data write processing based on the received data write command.

At step 1404, the host apparatus 101 judges whether or not the first functional unit (the memory module) 112 completes the data write processing within a predetermined time. This predetermined time is a time in which the processing can be surely completed when processed normally. This processing time differs depending on a type of the processing or a data amount or the like.

When the data write processing is completed within the predetermined time at step 1404, the control flow proceeds to step 1412. At step 1412, the controller 811 rewrites the processing status register 231 corresponding to the first functional unit (the memory module) 112 to zero (Function-Unprocessed State), and then the control flow terminates. The first functional unit (the memory module) 112 can execute a new processing based on a command from the host apparatus 101.

When the data write processing is not completed within the predetermined time at step 1404i the host apparatus 101 judges that the write processing of the first functional unit (the memory module) 112 is frozen, and the control flow proceeds to step 1405. At step 1405, the controller 811 rewrites the activation command register 211 corresponding to the first functional unit (the memory module) 112 to zero (stop) based on a command from the host apparatus 101. At step 1406, the controller 811 rewrites the operable status register 221 corresponding to the first functional unit (the memory module) 112 to zero (inoperable state). At step 1407, the controller 811 rewrites the processing status register 231 corresponding to the first functional unit (the memory module) 112 to zero (Function-Unprocessed State). At step 1408, the activation of the first controller (the memory module) 112 is stopped.

At step 1409, the controller 811 rewrites the activation command register 211 corresponding to the first controller (the memory module) 112 to one (activation) based on a command from the host apparatus 101. At step 1410, the activation of the first controller (the memory module) 112 is started. At step 1411, the controller 811 rewrites the operable status register corresponding to the first controller (the memory module) 112 to one (operable state) when recognizing that the first controller (the memory module) 112 turns into an activation completion state (operable state) via the status information line, and then the control flow terminates. The first controller (the memory module) 112 can executes a new processing based on a command from the host apparatus 101.

At steps 1408 and 1410, only the first controller (the memory module) 112 is stopped or activated. The second functional unit 113 and the third functional unit 114 continue to be in operable states.

In the present implemental example, the case in which the first functional unit (the memory module) 112 performs the data write processing, has been described. In a similar manner, the functional unit can be reactivated based on overtime or the like for the other processing performed by the other functional unit.

In the second and third implemental examples, each of the activation command registers, the operable status registers, the processing status registers, and the bus release registers is represented by one-bit data of one or zero. However, the present invention is not limited to this.

In the present implemental example, the multifunctional IC card including the three functional units has been described. However, the number of functional units included in the multifunctional IC card is not limited to three.

In the present implemental example, each functional unit can be activated independently. It is unnecessary to reactivate all the functional units when one functional unit is frozen. This leads to that only the frozen functional unit can be reactivated without suspending the operation of the other functional unit even while the other functional unit is operating. In addition, even while the frozen functional unit is being reactivated, the host apparatus can transmit a processing command to the other functional unit, and the functional unit can start a processing.

The present invention can be applied not only to the multifunctional IC card but also a predetermined electronic apparatus (including a plurality of functional units, and in which a host apparatus communicates with the respective functional units via a common interface independently of one another).

Although the present invention has been described with respect to its preferred embodiments in some detail, the disclosed contents of the preferred embodiments may change in the details of the structure thereof, and any changes in the combination and sequence of the component may be attained without departing from the scope and spirit of the claimed invention.

The electronic apparatus according to the present invention can be used as the multifunctional IC card.

The invention claimed is:

1. An electronic apparatus comprising:
a controller including an interface part which communicates with an external host apparatus, and a status register group; and
a plurality of functional units communicating with the host apparatus via the interface part, respectively,
wherein the status register group includes a plurality of operable status registers which correspond to said plurality of functional units, respectively, and which indicate whether a corresponding plurality of functional units are operable in an operable state or not in an inoperable state, and a plurality of processing status registers which correspond to said plurality of functional units, respectively, and which indicate whether the corresponding plurality of functional units are executing processing in a Function-Being-Processed State or not in a Function-Unprocessed State wherein said controller transfers a command to a functional unit when said controller receives the command from the host apparatus and the command is a command for any one of said plurality of functional units, and transmits a status of the status register group to the host apparatus as a response to the read command when the command is a read command for the status register group, wherein the interface part performs a master-slave system type data communication with the host apparatus, in which the host apparatus serves as a master, and the electronic apparatus serves as a slave, and wherein the functional unit starts activating upon receiving an activation command from the host apparatus; the operable status register corresponding to the functional unit turns from the inoperable state to the operable state when the functional unit turns into the operable state; and the functional unit stops operation thereof and turns into the inoperable state, and the operable status register corresponding to the functional unit turns from the operable state to the inoperable state upon receiving a stop command for the functional unit from the host apparatus.

2. The electronic apparatus as claimed in claim 1,
wherein all the operable status registers of the status register group and all the processing status registers of the status register group are set to the inoperable state and the Function-Unprocessed State, respectively, when said controller is activated.

3. The electronic apparatus as claimed in claim 1,
wherein the status register group further includes a plurality of activation command registers corresponding to said plurality of functional units, respectively, the activation command registers for activating the corresponding plurality of functional units,
wherein all the activation command registers of the status register group are set to be stopped when said controller is activated, and
wherein the host apparatus staffs activation of the functional unit by setting one of the activation command registers corresponding to one of said plurality of functional units that is to be activated, to be activated, and stops the functional unit by setting the activation command register to be stopped.

4. The electronic apparatus as claimed in claim 1,
wherein the interface part performs a master-slave system type data communication with the host apparatus, in which the host apparatus serves as a master, and the electronic apparatus serves as a slave,
wherein the processing status register corresponding to the functional unit turns from the Function-Unprocessed State to the Function-Being-Processed State when the functional unit is in the Function-Being-Processed State, and
wherein the processing status register corresponding to the functional unit turns from the Function-Being-Processed State to the Function-Unprocessed State when the functional unit finishes the function processing or when the functional unit is suspended in response to a command from the host apparatus.

5. The electronic apparatus as claimed in claim 4,
wherein the host apparatus and the interface parts are connected to each other via a line including a command signal line and a data line,
wherein the command from the host apparatus to the electronic apparatus, the response from the electronic apparatus to the host apparatus, and data including data showing the status information on the status register group, are transmitted via the command signal line, and
wherein predetermined data that is to be transmitted from the host apparatus to the electronic apparatus, predetermined data that is to be transmitted from the electronic apparatus to the host apparatus, and a busy signal that indicates that the functional unit is in the Function-Being-Processed State and in busy state, are transmitted via the data line.

6. The electronic apparatus as claimed in claim 5,
wherein the status register group further includes a plurality of bus release registers each of which releases a busy state of the data line so that the host apparatus transmits and receives data to and from one of said plurality of functional units other than the functional unit that is executing processings when the functional unit that is in the Function-Being-Processed State outputs the busy signal to the data line,
wherein said controller rewrites the bus release register upon receiving a rewrite command for the bus release register from the host apparatus, and
wherein the interface part makes the host apparatus possible to transmit and receive the data to and from the functional unit other than the functional unit that is executing processings by stopping outputting the busy signal to the data line.

7. The electronic apparatus as claimed in claim 5,
wherein the functional unit that is in the Function-Being-Processed State acquires a bus use right when data transmission and reception between the host apparatus and said plurality of functional units is finished or when operation of said plurality of functional units is stopped, and said plurality of functional units selected by the host apparatus acquires the bus use right when the processing status registers corresponding to said plurality of functional units are in the Function-Being-Processed State, in the case that the host apparatus activates a plurality of functional units.

8. The electronic apparatus as claimed in claim 1,
wherein the electronic apparatus is a multifunctional IC card.

9. A method of controlling the electronic apparatus, the electronic apparatus comprising a plurality of functional units and a state register group including a plurality of operable status registers which correspond to the plurality of functional units, respectively, and which indicate whether the corresponding plurality of functional units are in an operable state or in an inoperable state, and a plurality of processing status registers which correspond to the plurality of functional units, respectively, and which indicate whether the corresponding plurality of functional units are in a Function-Being-Processed State or a Function-Unprocessed State, the method, comprising:
a first rewrite step of rewriting the operable status registers according to whether or not the corresponding plurality of functional units are in the operable state;
a second rewrite step of rewriting the processing status registers according to whether or not the corresponding plurality of functional units are in the Function-Being-Processed State;
a first command reception step of transferring a command to a functional unit upon receiving the command for the plurality of functional units from an external host apparatus; and
a second command reception step of transmitting a status of the status register group to the host apparatus as a response to a read command upon receiving the read command for the status register group from the host apparatus,
wherein the method is a control method of the electronic apparatus for performing a master-slave system type data communication with the host apparatus, in which the host apparatus serves as a master, and the electronic apparatus serves as slave,
wherein the first rewrite step includes starting activation of the functional unit upon receiving an activation command for the plurality of functional units from the host apparatus, rewriting the operable status register which corresponds to the functional unit from the inoperable state to the operable state when the functional unit turns into the operable state, and stopping operation of the functional unit to make the functional unit in the inoperable state and rewriting the operable status register corresponding to the functional unit from the operable state to the inoperable state upon receiving a stop command for the functional unit from the host apparatus.

10. The method of controlling the electronic apparatus as claimed in claim 9,
wherein the first rewrite step includes setting all of the operable status registers of the status register group into an inoperable state when said controller is activated, and
wherein the second rewrite step includes setting all of the processing status registers of the status register group into a Function-Unprocessed State when said controller is activated.

11. The method of controlling the electronic apparatus as claimed in claim 9,
wherein the status register group further includes a plurality of activation command registers corresponding to the plurality of functional units, respectively, the activation command registers for activating the corresponding plurality of functional units,
wherein the method further includes steps of:
setting all the activation command registers of the status register group not to be activated when said controller is activated;
rewriting an activation command register corresponding to the functional unit to activate upon receiving an activation command for one of said plurality of functional units from the host apparatus;
activating the functional unit;
rewriting the activation command register corresponding to the functional unit not to be activated upon receiving a stop command for the functional unit from the host apparatus; and
stopping the functional unit.

12. The method of controlling the electronic apparatus as claimed in claim 9,
wherein the method is a control method of the electronic apparatus for performing a master-slave system type data communication with the host apparatus, in which the host apparatus serves as a master, and the electronic apparatus serves as a slave, and
wherein, at the second rewrite step, the processing status register corresponding to the functional unit turns from the Function-Unprocessed State to the Function-Being-Processed State when the functional unit is in the Function-Being-Processed State; and the processing status register turns from the Function-Being-Processed State to the Function-Unprocessed State when the functional unit finishes processing or when the functional unit is suspended in response to a command from the host apparatus.

13. The method of controlling the electronic apparatus as claimed in claim 12,
wherein the host apparatus and the electronic apparatus are connected to each other to via a line including a command signal line and a data line, and
wherein the method further includes steps of:
transmitting the command from the host apparatus to the electronic apparatus, the response from the electronic apparatus to the host apparatus, and data including data showing the status information on the status register group via the command signal line; and
transmitting predetermined data transmitted from the host apparatus to the electronic apparatus, predetermined data transmitted from the electronic apparatus to the host apparatus, and a busy signal via the data line.

14. The method of controlling the electronic apparatus as claimed in claim 13,
wherein the status register group further includes a plurality of bus release registers corresponding to the plurality of functional units, respectively, and each of which releases a busy state of the data line so that the host apparatus transmits and receives data to and from one of the plurality of functional units other than the functional unit that is executing processings when the functional unit that is in the Function-Being-Processed State outputs the busy signal to the data line, and
wherein the method including steps of:
rewriting the bus release registers upon receiving a rewrite command for the bus release register from the host apparatus; and
stopping outputting the busy signal to the data line, and transmitting and receiving the data between the host apparatus and the functional unit other than the functional unit that is executing processings.

15. The method of controlling the electronic apparatus as claimed in claim 13, including a step of:
allowing the functional unit in the Function-Being-Processed State to acquire a bus use right when data transmission and reception between the host apparatus and the plurality of functional units is finished or when operation of the plurality of functional units is stopped, and allowing the plurality of functional units selected by the host apparatus to acquire the bus use right when the processing status registers corresponding to the plurality of functional units that are actived are in the Function-Being-Processed State, in the case that the host apparatus activates a plurality of functional units.

* * * * *